US008229879B2

(12) United States Patent
Jannarone et al.

(10) Patent No.: US 8,229,879 B2
(45) Date of Patent: Jul. 24, 2012

(54) SYSTEM AND METHOD FOR AUTO-ADAPTIVE NETWORK

(75) Inventors: Robert J. Jannarone, San Diego, CA (US); John Tyler Tatum, Atlanta, GA (US); Thuy Xuan Cox, Suwanee, GA (US); Leronzo Lidell Tatum, College Park, GA (US)

(73) Assignee: Brainlike, Inc., Atlanta, GA (US)

( * ) Notice: Subject to any disclaimer, the term of this patent is extended or adjusted under 35 U.S.C. 154(b) by 712 days.

(21) Appl. No.: 12/412,680

(22) Filed: Mar. 27, 2009

(65) Prior Publication Data
US 2010/0138378 A1 Jun. 3, 2010

Related U.S. Application Data

(63) Continuation-in-part of application No. 11/907,259, filed on Oct. 10, 2007, now Pat. No. 7,887,337, and a continuation-in-part of application No. 11/484,874, filed on Jul. 10, 2006, now Pat. No. 7,529,721.

(60) Provisional application No. 61/040,547, filed on Mar. 28, 2008, provisional application No. 60/850,279, filed on Oct. 10, 2006, provisional application No. 60/697,355, filed on Jul. 8, 2005.

(51) Int. Cl.
*G06F 15/18* (2006.01)
*G06K 9/62* (2006.01)
*G06N 5/04* (2006.01)
(52) U.S. Cl. ............... 706/61; 706/20; 706/21; 706/22
(58) Field of Classification Search ............. 706/61
See application file for complete search history.

(56) References Cited

U.S. PATENT DOCUMENTS

| 5,966,178 | A | 10/1999 | Tashima et al. |
| 7,529,721 | B2 | 5/2009 | Jannarone et al. |
| 2005/0232512 | A1 | 10/2005 | Luk et al. |
| 2006/0074741 | A1 | 4/2006 | Orumchian et al. |

(Continued)

FOREIGN PATENT DOCUMENTS
JP  03-150916 A  6/1991
(Continued)

OTHER PUBLICATIONS

Weiss et al., Ensemble De-Noising of Spatio-Temporal EEG and MEG Data [online], 1998 [retrieved on Dec. 30, 2011]. Retrieved from the Internet: < URL:http://citeseerx.ist.psu.edu/viewdoc/summary?doi=10.1.1.31.7892>.*

(Continued)

*Primary Examiner* — Alan Chen
*Assistant Examiner* — Nathan Brown, Jr.
(74) *Attorney, Agent, or Firm* — Stephen C. Beuerle; Procopio Cory Hargreaves & Savitch LLP

(57) ABSTRACT

An auto-adaptive system is provided that includes a template builder that allows weighted templates to be created for computing auto-adaptive features, an auto-adaptive event locator that analyzes a data set to identify events, an event extractor that locates and extracts identified events and provides events for review by an event analyzer (operator or programmed module) to distinguish clutter data from target data, and an auto-adaptive risk analyzer that processes data related to hit rates, false alarm rates, alarm costs, and risk factors to determine return on investment information and receiver operator characteristic curves.

18 Claims, 18 Drawing Sheets

U.S. PATENT DOCUMENTS

2008/0063237 A1 3/2008 Rubenstein
2008/0097802 A1 4/2008 Ladde et al.

FOREIGN PATENT DOCUMENTS

JP 06-222809 A 8/1994
KR 1020020062070 7/2002

OTHER PUBLICATIONS

International Search Report and Written Opinion for PCT/US06/27006 issued May 8, 2007.
Wu et al., Adaptive Nearest Neighbor Search for Relevance Feedback in Large Image Databases, ACM Multimedia, Oct. 5, 2001, pp. 89-97.
McBader et al., A Programmable Image Processing Architecture for Embedded Vision Systems, Proc. 14th IEEE International Conference on Digital Signal Processing, DSP 2002, Jul. 3, 2002, pp. 1269-1272.
Sun, Motion Activity for Video Indexing, Ph.D. Thesis, University of California, Santa Barbara, Jun. 2004, entire document, especially fig 5-1, p. 92.
International Search Report and Written Opinion for PCT/US2008/064276 issued Dec. 18, 2008.
Gao et al., Evaluating Continuous Nearest Neighbor Queries for Streaming Time Series via Pre-fetching, 2002.
U.S. Appl. No. 12/432,514, filed Apr. 29, 2009, Jannarron et al.
International Search Report and Written Opinion dated Dec. 1, 2009 for PCT/US09/038665.

\* cited by examiner

```
          time  sp_1 Sp_2 sp_3 f_in  f_out                    450
Slices: 2    2    1    5    1    4

Order
                        1      time  1  1  1  1  1  2  2  2  2  2
                        0      Sp_1
                        0      Sp_2
                        2      Sp_3  1  2  3  4  5  1  2  3  4  5
                        0      f_in
                        0      f_out
Order:
 0    2    0    0    0    1
time  sp_1 Sp_2 sp_3 f_in  f_out
 1                           1   1  1  1  1  1  1  1  1  1  1
 2                           1   1  1  1  1  1  1  1  1  1  1
 1                           2   1  1  1  1  1  1  1  1  1  1
 2                           2   1  1  1  1  1  1  1  1  1  1
 1                           3   1  1  1  1  1  1  1  1  1  1
 2                           3   1  1  1  1  1  1  1  1  1  1
 1                           4   1  1  1  1  1  1  1  1  1  1
 2                           4   1  1  1  1  1  1  1  1  1  1
```

SYSTEM AND METHOD FOR AUTO-ADAPTIVE NETWORK

RELATED APPLICATION

The present application claims priority to U.S. provisional patent application Ser. No. 61/040,547 filed Mar. 28, 2008 and is a continuation-in-part of U.S. patent application Ser. No. 11/907,259 filed Oct. 10, 2007, which claims priority to U.S. provisional patent application Ser. No. 60/850,279 filed Oct. 10, 2006 and is a continuation-in-part of U.S. patent application Ser. No. 11/484,874 filed Jul. 10, 2006, which claims priority to U.S. provisional patent application Ser. No. 60/697,355 filed Jul. 8, 2005, each of which is incorporated herein by reference in its entirety.

BACKGROUND

1. Field of the Invention

The present subject matter relates generally to machine learning and more specifically to efficient processing of data sets generated by applications providing auto-adaptive functions in an auto-adaptive network to locate and extract events and analyze risks.

2. Related Art

Auto-adaptive systems have many applications. These applications include event recognition based on data measured over a number of successive time periods. Events take many different forms. For example, events may include detection of a target in a particular area, sensing of an out-of-specification condition in a physical process environment or correspondence of processed psychometric measurements with a particular behavior prediction profile. Anomaly sensing is often an element of detecting an event. Event recognition may also comprise evaluation of sensed data to recognize or reject existence of conditions indicated by the data or to initiate a particular action.

One use of event detection is in military operations. When making critical combat decisions, a commander must often decide to either act at once or hold off and get more information. Immediate action may offer tactical advantages and improve success prospects, but it could also lead to heavy losses. Getting more data may improve situational awareness and avoid heavy losses, but resulting delays may cause other problems. Making the right choice depends strongly on knowing how much could be gained from gathering more information, and how much could be lost by delaying action.

In conventional solutions, data is collected in the field by sensors of one kind or another. In the context of the present description, a sensor is an item that provides information that may be used to produce a meaningful result. Data is collected over successive time periods, generally from an array of sensors. Depending on the conditions being analyzed and the type of sensors utilized, different types of data points may be established. For example, a data point characterizing a position of a point in a plane may be characterized by x and y coordinates. Such a point has two spatial dimensions. Other dimensions may also exist. For example, if the data point describes the condition of a pixel in a television display, the data point may be further characterized by values of luminance and chroma. These values are characterized as further dimensions of a data point.

In order to describe an environment mathematically, event recognition adaptive algorithms process successive signals in one or a plurality of dimensions to converge on a model of the background environment to track the background's dynamic change. Systems employing such algorithms are referred to as machine learning and can be implemented in parallel configurations to allow for extra speed afforded by parallel processing. When an event occurs within a sensor's area of response, e.g., within a field of view of optical sensors, the adaptive algorithms determine if the return is sufficiently different from the background prediction. Domain specific event identification algorithms may then be applied to verify if an event has occurred in order to minimize the likelihood and number of false positives.

An important aspect of the adaptive algorithm approach is a dynamic detection threshold that enables these systems to find signals and events that could otherwise be lost in noise were they to be compared to fixed thresholds. Having a dynamic threshold also allows a system to maintain a tighter range on alarm limits. Broader alarm ranges decrease the ability of the system to distinguish anomalous conditions from normal conditions.

These conventional complex event detection systems have many known drawbacks and require powerful processors rather than the simpler, less expensive field programmable gating arrays ("FPGAs") that are desirable for field deployment. Additionally, many conventional complex event detection systems use C++ programming, which is effective but slow in comparison to the simple instructions used for FPGAs. However, as new unmanned vehicles are being developed that are smaller, more agile, and have the capability of reaching places that have not been reached before, the demands made upon the data processing capabilities of these conventional systems have increased dramatically.

Conventional complex event detection systems also lack efficient ways of handling large arrays of data. In many applications, processor in the field will need to respond to large data sets output from a large number of sensors. The sensors will be producing consecutive outputs at a high frequency. Conventional systems process these data sets using the inverse of a covariance matrix, which is a highly complex calculation, especially when the number of covariates is large. Additionally, these conventional complex event detection systems are designed to handle event detection and adaptive learning after entire sets of data have been collected, which is extremely inefficient and undesirable in field deployed applications. Furthermore, conventional systems fail to incorporate risk analysis when processing data sets in the field. Accordingly, what is needed is a system and method that overcomes these significant problems found in the conventional systems as described above.

SUMMARY

Embodiments of the present invention include an auto-adaptive template builder that allows weighted templates to be created for computing auto-adaptive features. Embodiments also include an auto-adaptive event locator that analyzes a data set to identify events and an auto-adaptive event extractor to locate and extract events for review by an event analyzer (e.g., an operator or programmed module) that distinguishes target data from clutter data that causes false alarms. Data set analysis features are then modified to account for identified false alarms/clutter data by the auto-adaptive template builder and incorporated into the weighted templates. Embodiments also include an auto-adaptive risk analyzer that processes data related to hit rates, false alarm rates, alarm costs, and risk factors to determine certain return on investment information, and certain hit versus false alarm curves—also referred to herein as receiver operator characteristic ("ROC") curves.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 1:
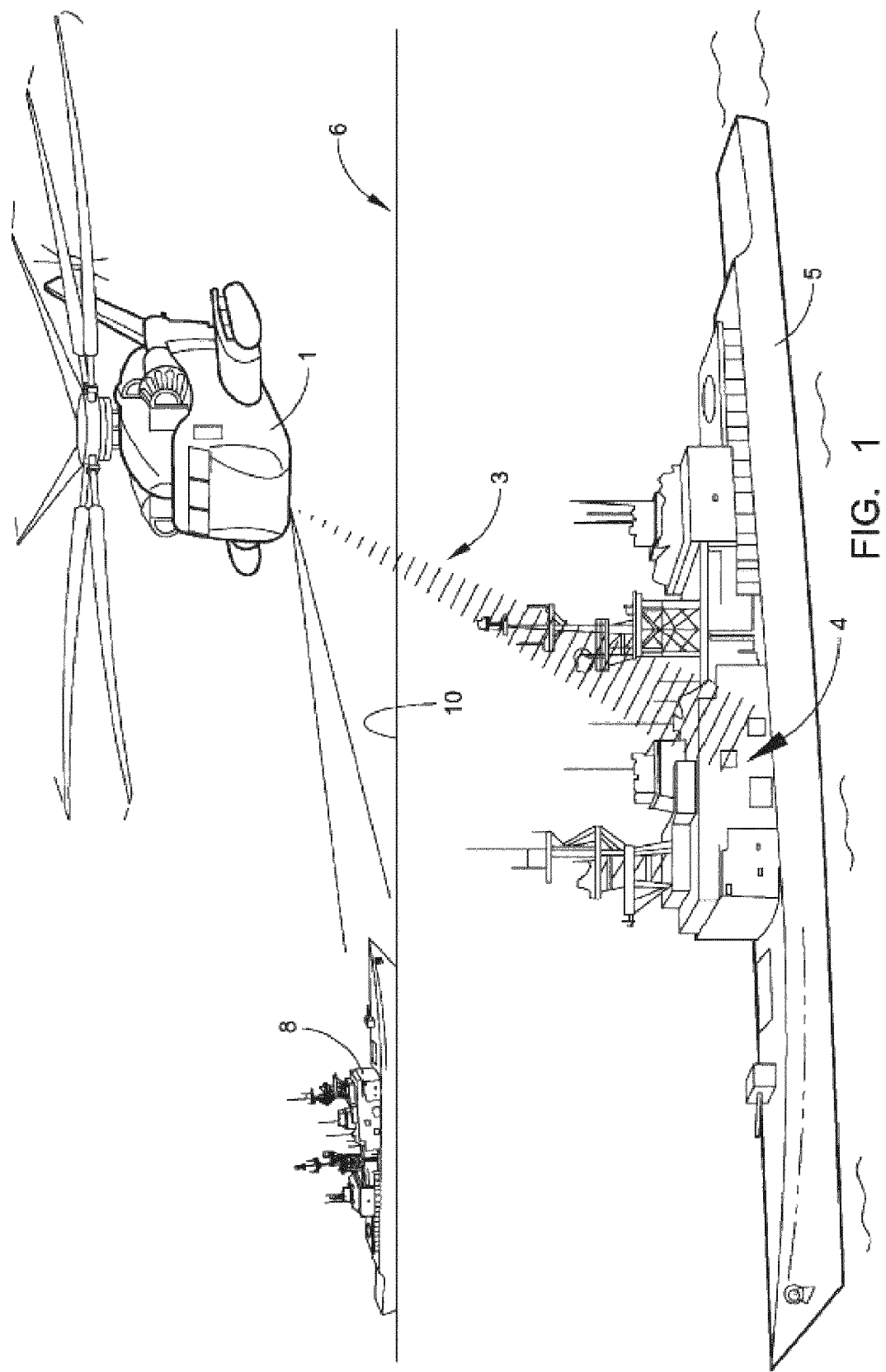
FIG. 1 is an illustration of an unmanned aerial vehicle ("UAV") employing an embodiment of the present invention gathering data and transmitting intelligence to a command and control station.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Embodiments of the present invention provide for operation referred to as auto-adaptive processing. Auto-adaptive processing is not a recognized term of art, but is descriptive of processing of data, often condition-responsive data received from a plurality of sensors in successive time slices, in order to update adaptive functions and to calculate imputed values of data for use in evaluating data and which may also be used to predict data. Time slices may also be referred to by such terms as clock periods or data cycles. For each time slice, measurement values and measurement plausibility values are supplied to the system, and a learning weight is either supplied to or generated by the system.

Auto-adaptive processing operations may include converting measurement values to feature values; converting measurement plausibility values to feature plausibility values; using each plausibility value to determine missing value status of each feature value; using non-missing feature values to update parameter learning; imputing each missing feature value from non-missing feature values and/or prior learning; converting imputed feature values to output imputed measurement values; and supplying a variety of feature value and feature function monitoring and interpretation statistics.

The above operations are performed by applying functions to selected data entries in a data array. Embodiments of the present invention utilize a "windowing" function in order to "index" through the data array to select successive groups of data entries for processing. Field programmable windowed functionality can be applied to many applications by programming the data entries to be utilized for a calculation and to set parameters of algorithms.

Embodiments of the present invention in one form provide for the option of embodying an auto-adaptive processor in the form of parallel, pipelined adaptive feature processor modules that perform operations concurrently. Tasks including, function monitoring, interpretation and refinement operations are done in parallel. Distribution of tasks into modules permits the use of simplified hardware such as FPGAs, as opposed to full processors in various stages. Auto-adaptive processing may be utilized for tasks that were previously considered to be intractable in real time on hardware of the type used in low powered, portable processors. The option of modular pipelined operation simplifies programming; design and packaging and allows for use of FPGAs in place of high-powered processors. Stationary learned parameter usage, based on the same estimation functions and learned parameter values, can be used to produce the estimates that in turn allow unexpected events to be detected more simply.

Embodiments of the present invention may be used in a very wide variety of applications. These applications include disease control, military attack prevention, measuring efficacy of antibiotics, detecting and monitoring system performance to prevent breakdowns. Event recognition may be used to trigger an alarm and initiate a response or produce a wide variety of other reactive or proactive responses. In one application, usability of data is evaluated so that a remote device may decide whether or not to utilize its limited power and bandwidth to transmit the data.

Figure 2:
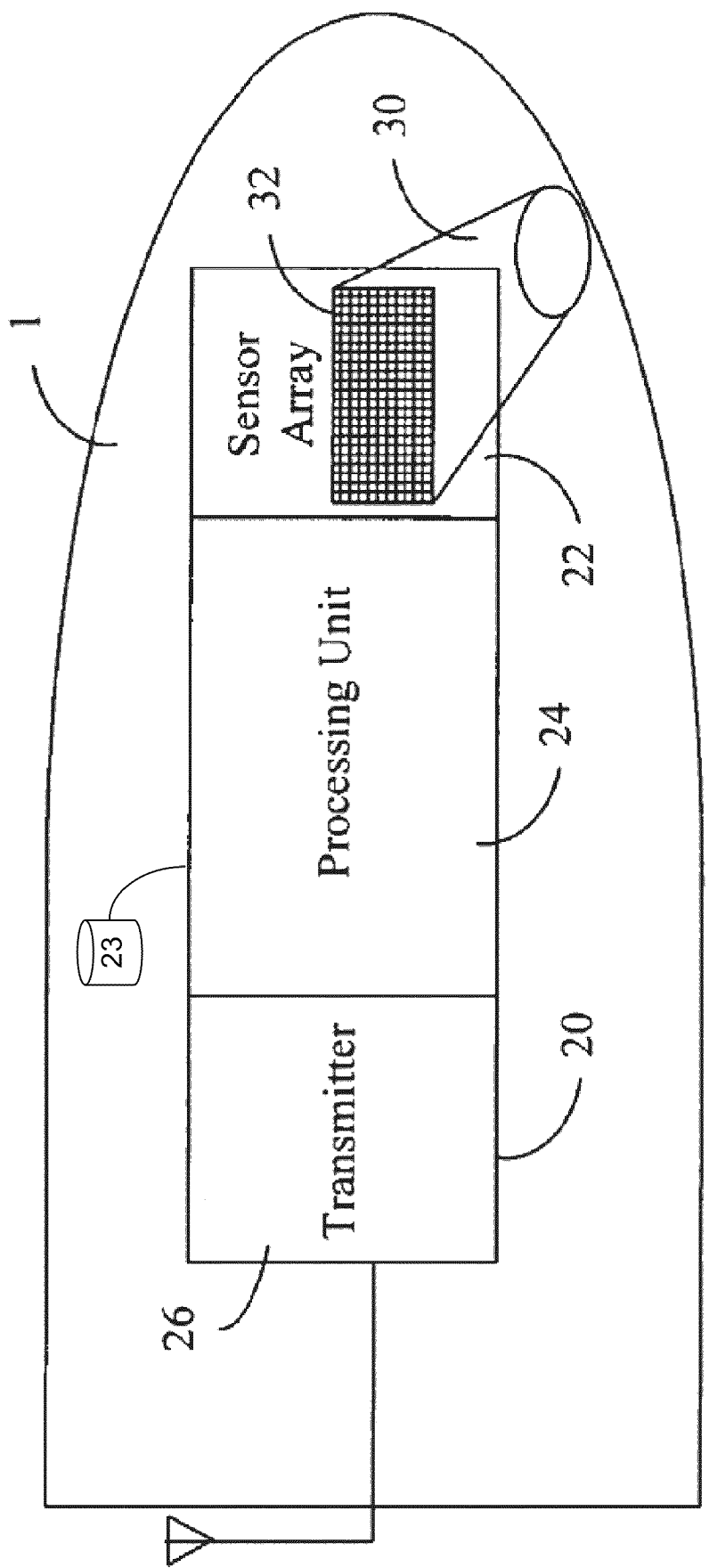
FIG. 2 is a block diagram of a system incorporating an embodiment of the present invention.
Figure 3:
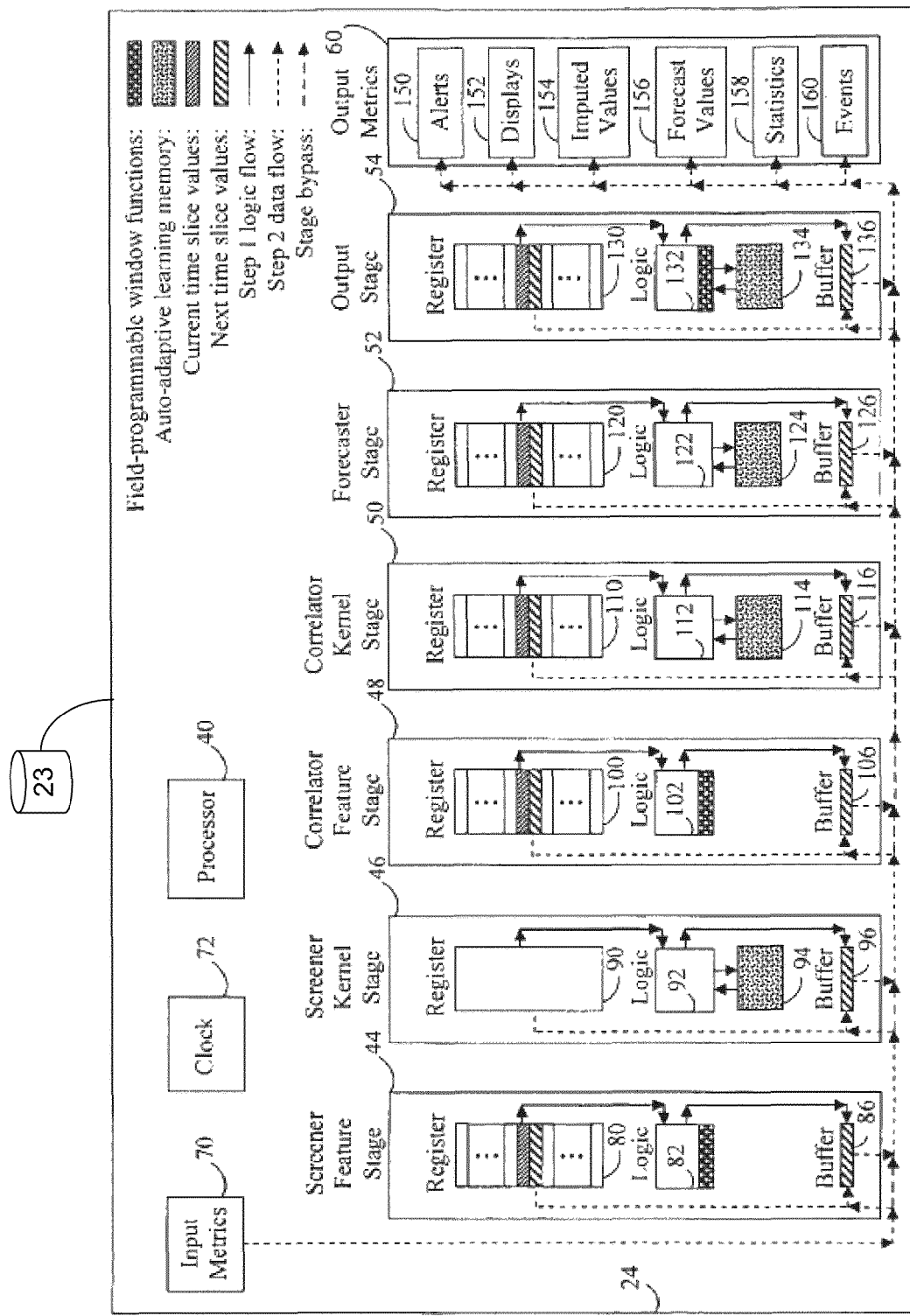
FIG. 3 is a block diagram of one form of processing unit included in the embodiment of FIG. 2.

In the present description, FIGS. 1-3 describe one embodiment of a physical hardware system within which the system may be implemented. One of the many applications for systems including an embodiment of the present invention is illustrated in FIG. 1. In this illustration, the UAV 1 is part of an intelligence system. The UAV 1 comprises an array of sensors, processors and a transmitter, further described and illustrated below. The UAV 1 provides video information via a radio frequency link 3 to a base station 4. In the present illustration, the base station 4 is housed in a ship 5. The ship 5 is traveling in an ocean 6. The UAV 1 may detect enemy craft 8. The enemy craft 8 may be beyond a horizon 10 of the ship 5. The transmitter within the UAV 1 must have sufficient bandwidth to provide detected video information to the base station 4. Data processing equipment and transmitter modulation circuitry must have sufficient capacity to transmit video information. Ideally, all video information provided from the UAV 1 to the base station 4 will be useful. To the extent that the base station 4 will be receiving non-useful information, the base station 4 will have to expend resources to call the non-useful information. Processing of non-useful information at the base station 4 will also slow the response to useful information.

Ambient conditions will have a tendency to obscure the view of the enemy craft 8 from the UAV 1. Moisture in the air is a common ambient condition. Very often, moisture in the air will not be sufficient to block obtaining a useful image. Optical filtering may also be used to reduce haze. However, clouds or rainstorms may be located between the enemy craft 8 and the UAV 1. The video data obtained when the enemy craft 8 are not viewable is referred to in the present description as non-useful information. Commonly, UAVs simply collect data and transmit the data to a base station. The UAV 1 must be provided with sufficient resources to transmit non-useful information. In accordance with embodiments of the present invention, data processing is done to determine whether information will be useful or not. One criterion that needs to be utilized to determine whether information is useful is a contrast level in an image sensed by the UAV 1. An image of cloud cover will have low contrast, while a useful image of the enemy craft 8 will include objects that have contrast with respect to their backgrounds. By preventing transmission of non-useful information, circuitry in the UAV 1 may be designed to have less robust circuitry and lower power requirements then a circuit which must also transmit non-useful information. The resulting decrease in total transmission of information permits the use of simpler circuitry and lowers power requirements. The efficiency and reliability of processing at the base station 4 is also increased.

The present system comprises a rapid learning system. A rapid learning system performs adaptive learning recursively, and in real time. Additionally, the rapid learning system monitors, forecasts or controls data in real-time. The present specification is described in the context of the art of adaptive systems. There is a wide range of literature further describing the basis for mathematics utilized herein and the construction and performance of learning systems. Further background is provided in R. J. Jannarone, Concurrent Learning and Information Processing, Chapman & Hall, New York, 1997.

A general block diagram of the system incorporating an embodiment of the present invention is shown in FIG. 2. The UAV 1 comprises an electronics unit 20 including a sensor array 22, a processing unit 24, a data storage area 23, and a transmitter 26. In the present illustration, the sensor array 22 comprises a video camera 30 having an array of pixels 32, each providing an output indicative of light focused on the pixel 32. The present embodiments may process measurements that are one-dimensional or multi-dimensional. A one-dimensional output could comprise a gray-scale level wherein a single value is indicative of pixel output. Alternatively, a plurality of values may represent output of one pixel, such as gray-scale level and color levels. The sensor array 22 provides data to the processing unit 24. The processing unit 24 provides video output to the transmitter 26. The data storage area 23 provides persistent and volatile storage of information for use by the various components of the system.

The present embodiments will achieve the necessary functions to produce meaningful output data as in the prior art. However, as further described below, the present embodiments will have a greater generality, efficiency, and affordability as compared to prior art in embodiments. Since speed and capacity of the system are vastly improved with respect to the prior art, a depth of processing is made available in applications where it could not be used before, for example, real-time video processing of entire rasters at many frames per second. New market segments for adaptive processing are enabled.

Data is gathered in successive time slices. The greater the temporal resolution of the data gathering, the shorter the period of each time slice will be. In order to provide for adaptive processing, data received from each of a plurality of sensors during successive time slices will be processed. The functions performed by the present embodiments include receiving input values in consecutive time slices and performing processing operations during each time slice. These operations may include estimating each input value from current and prior input values through the use of a correlation matrix; comparing each estimated value to its actual value to determine whether or not the actual value is deviant; replacing deviant or missing input values with their estimated values as appropriate; and updating learned parameters. Updating all learned parameters is important, because it allows event recognition criteria to be continuously, automatically, and adaptively updated over time.

FIG. 3 is a block diagram of an example processing unit according to an embodiment of the invention. Operation of each of the modules 44 through 60 is described further below with respect to FIGS. 4-10. Structure of these modules is described with respect to FIG. 3. It should be noted that the name of each module in FIG. 3 is selected for description in context of the present illustration, and does not constitute a particular limitation with respect to structure or operation. The modules 44 through 60 are connected to provide data or other signals either in series or pipelined to successive stages. Particular connections are controlled by the program module 42. The connections are programmed to provide the operation described in FIGS. 4-10 below. FIG. 3 is first described with respect to the hardware therein and how estimating functions are achieved. Forecasting in accordance with present embodiments is explained.

The modules 44 through 60 each have an input terminal connected to a register 80, 90, 100, 110, 120 and 130 respectively. The registers 80, 90, 100, 110, 120 and 130 each respectively provide an input to logic units 82, 92, 102, 112, 122 and 132 from the logic units 92, 112, 122 and 132 respectively. First through sixth buffers 86, 96, 106, 116, 126 and 136 receive data from the logic units 82, 92, 102, 112, 122, and 132 respectively. Additionally, in the modules 46, 50, 52 and 54, auto adaptive learning memory units 94, 114, 124 and 134 are interactively connected with the logic units 92, 112, 122 and 132 respectively.

Each of the buffers 86 through 136 provides an output to each respective successive module and to the output metrics module 60. The output metrics module 60 includes registers for functions selected by a user. In the present illustration, registers 150, 152, 154, 156, 158 and 160 are provided. These registers may respectively receive alert information based on comparison to a threshold or other signature, displays, even to take values, forecast values, statistics, and events. The events register 160 responds to selected criteria, for example, a preselected degree of deviation of a measured value from an expected value.

Input values and calculated values are provided from the input metrics circuit 70. For example, a side scan sonar receiver may include 512 sensors in a row. A number of spatial dimensions for the side scan sonar row is one. Dimensions may be spatial, temporal or may be indicative of each a multiplicity of values associated with each cell, e.g., temperature.

Calculated values are generated to describe the data. The calculated values are functions of input values selected to reveal information about a collected set of data. In the present illustration, the calculated values include four screener features per cell. Screener and correlators features are functions that are designed to discriminate improbable or out-of-range data input points from background clutter. Screener and correlator features provide measures of deviance between actual and expected feature values. In one form of processing of side scan sonar values, a set of functions has been developed for distinguishing presence or absence of a target and whether the target is a Type 1 target or a Type 2 target. In one form, a Type 1 target is indicated when a first pair of feature deviance values is large, and a Type 2 target is indicated when a second pair of feature deviance values is large. Both pairs will have a small deviance value in the absence of a target.

A brief, qualitative overview of the operation of the processing unit 24 in FIG. 3 will now be provided. The processing unit is embodied of modules that may be embodied by components such as FPGAs processing feature values using selected modules. Each module calculates a component function of feature value generation. Individual modules can be placed in a selected order, and more than one of each type of module may be provided.

The input metrics circuit 70 provides input signals derived from sources, usually sensors, for processing by a processing unit 24. The screener feature stage 44 and the screener kernel stage 46 condition the inputs from the input metric circuit 70 used in statistical processing. The screener kernel stage 46 generates deviation values between measured and predicted values. The correlator feature stage 48 further processes deviance and plausibility values for selected time slices. The forecaster stage 52 in one form uses the same current and recent feature values for prediction as the correlator kernel stage 50 uses for imputing.

Values from the correlator stage register 110 are translated through the buffer 114 and are encapsulated in a forecast packet delivered to the register 120. A forecast packet register is embodied in the register 120. The forecasting packet may include values such as a MVSCP matrix. A forecaster will commonly include a routine for producing mean squared deviance (MSD) values. The forecaster stage produces learned cross-product parameters as part of the forecasting process.

Referring now to FIGS. 4 through 10, the processing unit 24 processes input data to provide known forms of statistical functions. Embodiments of the present invention facilitate real time generation of statistical functions by the processing unit 24. Processing of large sets of data that have previously been intractable in the environment of a self-powered remote vehicle is also facilitated. The processing unit 24 may include functionality to provide selected statistical calculations. The inclusion of a particular module in the processing unit 24 is optional. The requirements for types of modules to be included in the processing unit 24 are a function of the application in which the system is employed. The particular modules included in the present illustration comprise a screener feature module 44, a screener kernel module 46, a correlator feature module 48, a correlator kernel module 50, a forecaster module 52 and an output module 54.

The operation of these modules is described with respect to FIGS. 4 through 9 respectively. A data-responsive module 60 is provided that may compare process data to criteria such as alert threshold values or event profiles. Additionally, the data-responsive module 60 may display values, and may also register imputed values, forecast values and statistics and event profiles. An input metrics circuit 70 is synchronized by a clock circuit 72 to provide inputs to the processing unit 24 comprising signals received from the sensors. The clock circuit 72 also synchronizes provision of output metric values in the module 64 for each time slice. In traditional applications, a single processing unit 24 may be provided. However, for facilitating processing of data represented by large numbers of input values, e.g., entire video frames at a nominal repetition rate, it is desirable to provide for parallel, pipelined operation utilizing a plurality of processing units 24 as further described with respect to FIG. 10.

Figure 4:
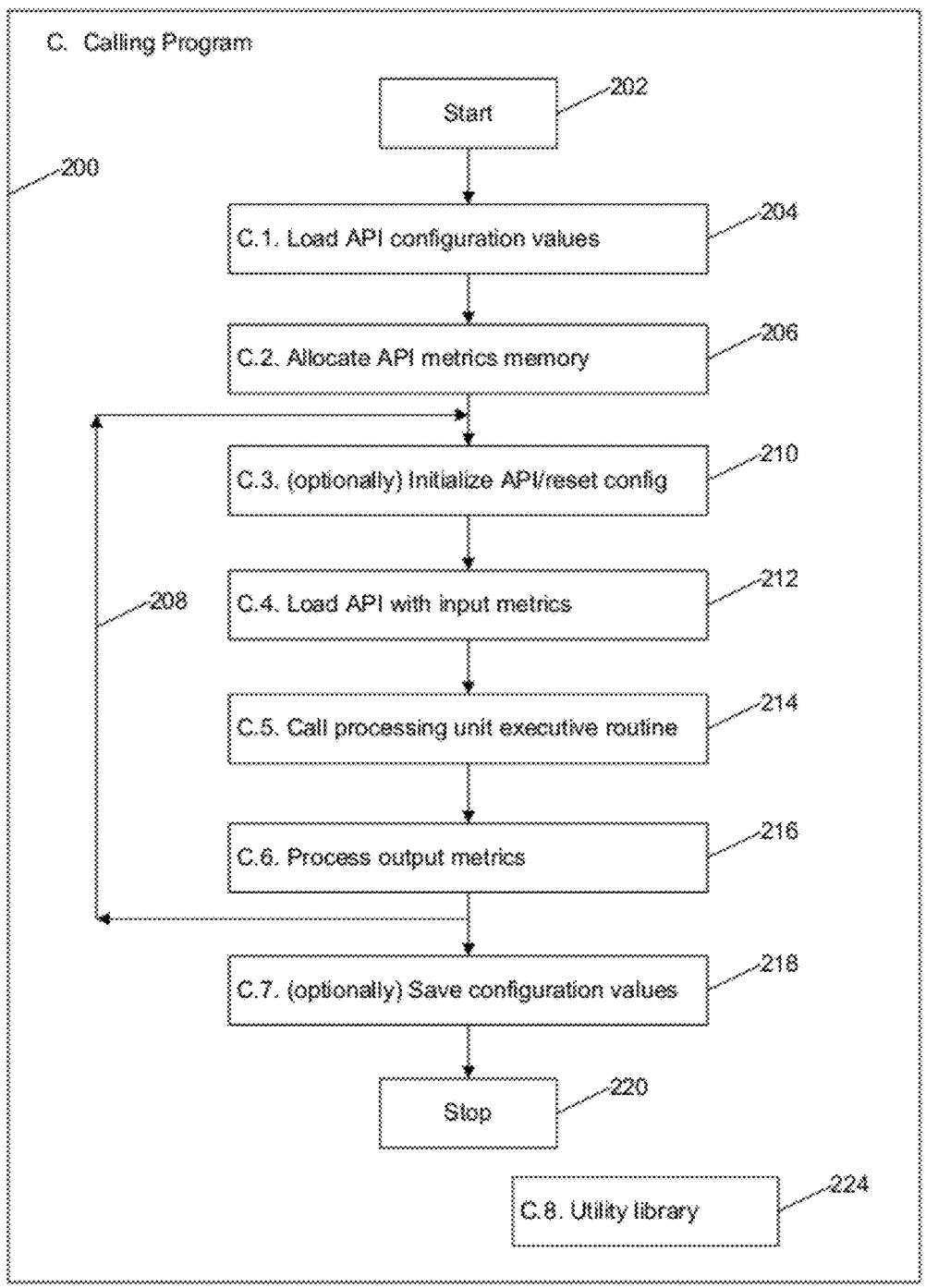
FIGS. 4 through 9 are each a flow diagram illustrating a performance of modular statistical routines within the processing unit according to an embodiment of the present invention.

FIG. 4 is a flowchart illustrating operation of the screener and kernel module 46. While the description of operation may be described from initial startup, the present description assumes that prior time slices have already occurred and that information is already present in the various registers. This is the typical situation. A routine that operates the screener feature module 44 will be referred to as a calling program 200. The calling program 200 starts at block 202, at which configuration programs are loaded. Configuration values include, for example, the number of dimensions, here one, the number of data inputs per dimension, here 512, and the number of input metric values per data point. Where the input is total sound intensity, the number of input metrics per data point is set at one. Where a data point includes sound intensity at each of three frequencies, the number of input metrics per data point is set at three. Configuration values also include the number of screener features per data point, here set at four and the number of correlator features per data point, here set at four. At block 204, the calling program 200 allocates memory for inputs from the input metrics circuit 70.

At block 206, the program 200 locates memory cells for the API metrics. In the present illustration, allocated API memory would include memory for 512 cell metric values and their 512 corresponding plausibility values. Plausibility value as used in this description is a number between zero and one used by a rapid learning system to control the weight of an input measurement with respect to learning. In one preferred form, the calling program 200 allocates data locations for API 10 values for 512 cells, locations for 512.times.4 for feature output values and memory for 512.times.4 correlator output feature values. The program 200 enters into a loop 208 in which updates and calculations may be performed. The loop 208 begins with block 210, and ends with block 216, which may return to the block 210.

The block 210 provides the locally programmable option to modify the above-described API configuration of memory locations. At block 212, input values are loaded into the memory locations dedicated thereto, and the corresponding plausibility values are also loaded. The calling program 200, at block 214, calls the first processor program, further described with respect to FIG. 5 below, which may comprise a set of deviation values between measured and predicted values. Following, at block 216, the system decides whether to return to block 210 to repeat the process or to proceed to a block 218 at which configuration values may be stored, after which at block 220, the routine stops. Criteria that may be employed at block 216 may include whether processing of data produced during each of a preselected number of time slices has been completed. Additionally, a utility library 224 may be accessed. The library 224 includes a broad variety of display and control functions for processing data to be furnished to the output metrics module 60 (FIG. 3).

Figure 5:
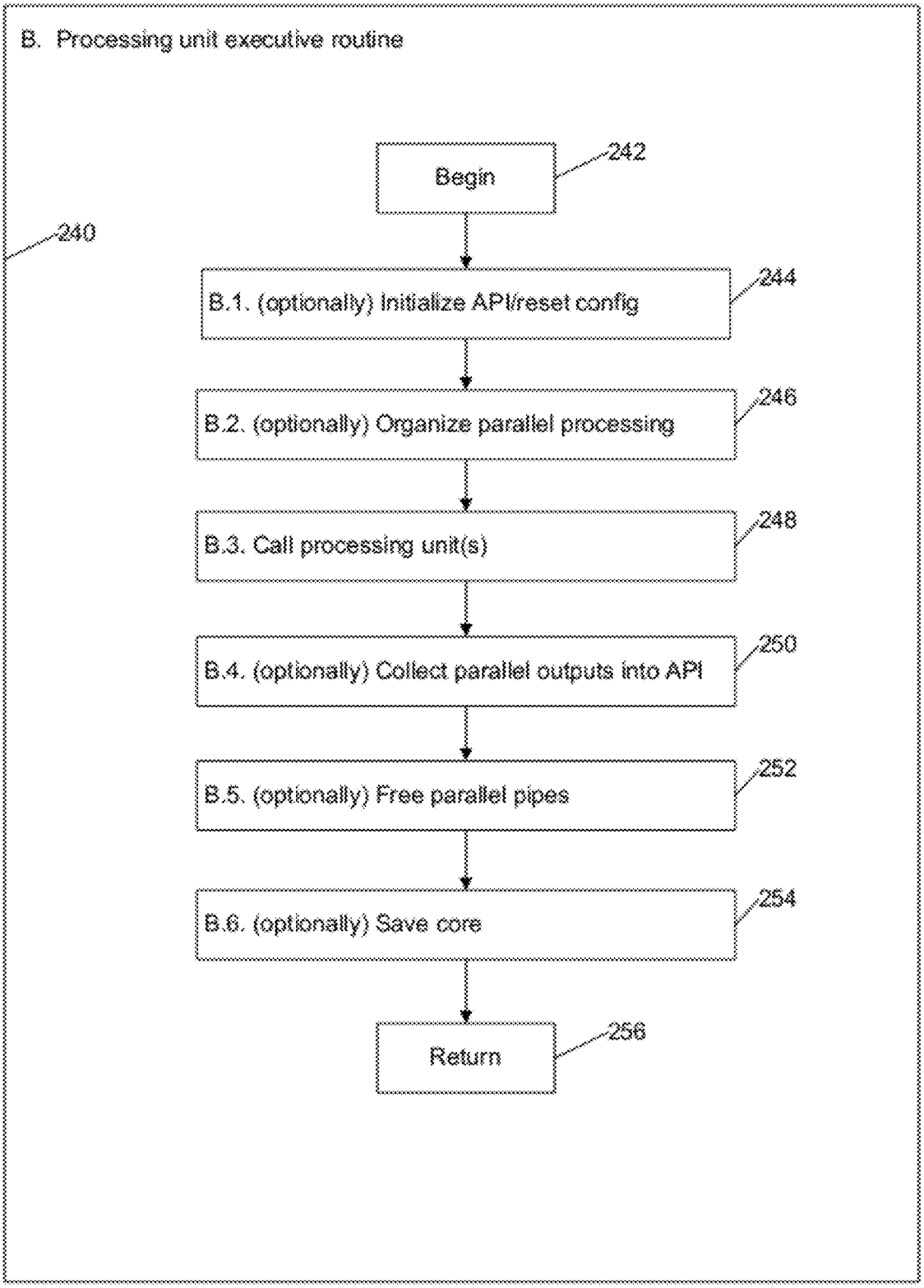

FIG. 5 is a flowchart illustrating programming and operation of the screener kernel module 46. A processing unit executive routine 240 begins at the block 242. At block 244, the processing unit executive routine 240 loads the API values accessed by the calling program 200. At block 246 the values may be organized for parallel processing in embodiments in which parallel processing is utilized. A significant factor in deciding whether to use parallel processing is the rate of arrival of new data and the period of each time slice. In a situation in which new data is arriving every 10 ns, and one processor required 75 ns to process data, then eight processors running in parallel would be needed to process data in real-time. It should be remembered that in the present context, real-time refers to processing without building up a backlog of sensor data. In the current illustration, a line of cells of 512 values is organized. Each parallel processor would process 64 cells. The processor routine would organize parallel processing by distributing sets of 64 input values and 64 plausibility values to corresponding processing modules.

At block 246, parallel output metrics are collected. Block 248 calls one or more processing units described in further detail with respect to FIG. 6. At block 252, free parallel outputs may be collected. At block 254, auto-adaptive learning memory (ALM) values are saved to a core file. At block 256, processing for a current time slice is completed, and the processing unit executive routine 240 returns to block 242 for processing during a next time slice.

Figure 6:
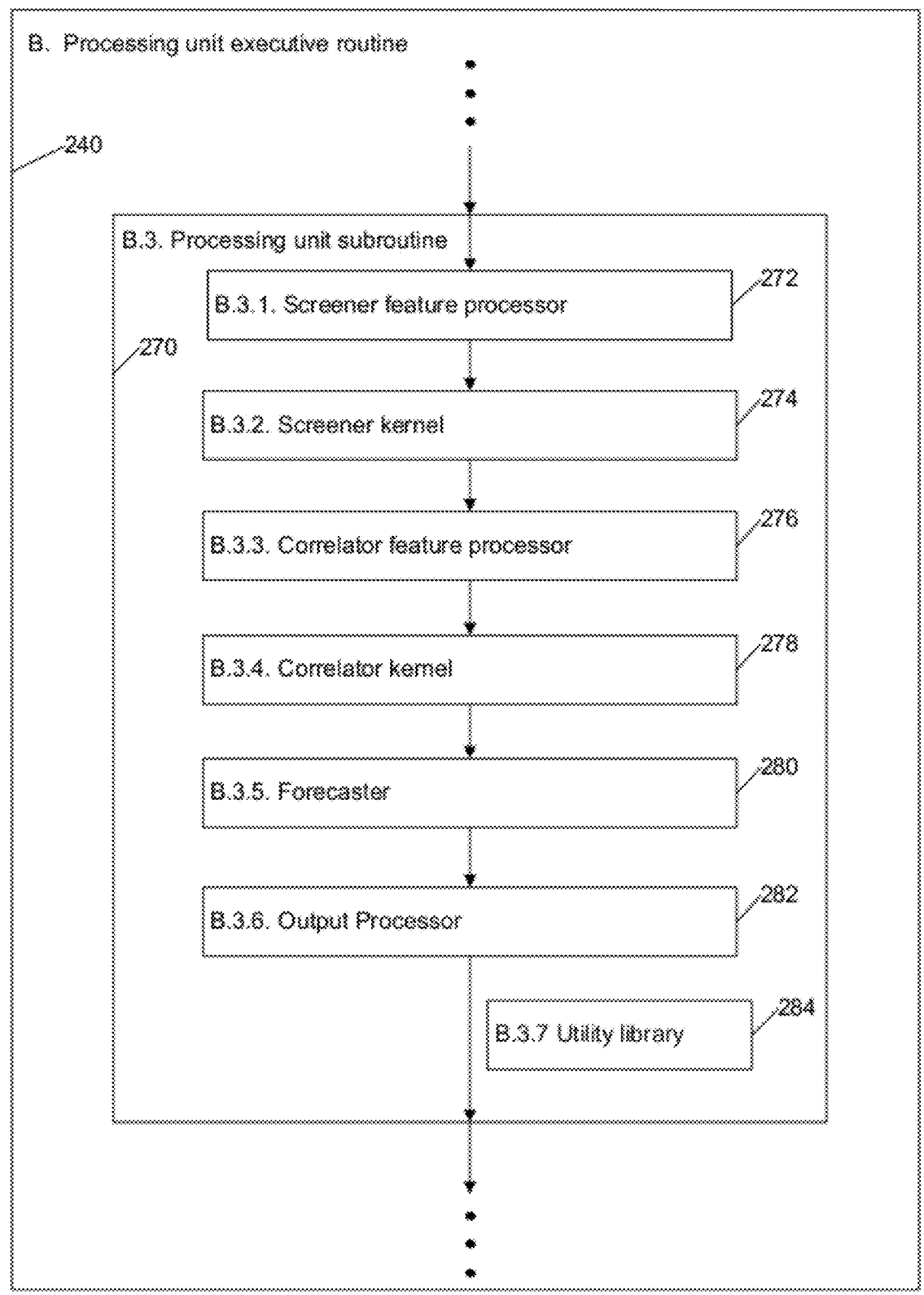

FIG. 6 is a flowchart illustrating programming and operation of a processing unit subroutine 270 which is called at block 248 in FIG. 5. The processing unit subroutine 270 begins with block 272, at which an operation performed in accordance with embodiments of the present invention and described in the present context as a window function is called. The window function is described in greater detail with respect to illustrations beginning with respect to FIG. 13 below. The windowing feature selects data from nearest data locations in time and space for calculation of values. At block 274, the screener kernel function, further described with respect to FIG. 7 below is called. At block 278, the correlator kernel function, described with respect to FIG. 8 is called. At block 280 the forecaster function may be called and at block 282, a range of output values for a current time slice is tabulated. The subroutine 272 utilizes a utility library 284.

When the screener kernel 274 is called, each feature input value for a given time slice is transformed into a deviance value. The deviance value comprises an input for the correlator feature function at block 276. When the correlator kernel 278 is called, the correlator kernel function 278 utilizes the window function to impute each current value as a function of a configurable number of nearest neighbor of values in time and space. This is explained in further detail beginning at the FIG. 13 below. At block 278, a correlation matrix is provided to the forecaster.

The forecaster function 280, when utilized, produces a forecast for each feature and each time slice, including any configurable number of future time slice forecasts. The forecaster function 280 may utilize prior art forecasting functions. While the forecasting functions are known, the forecasting output values are utilized in accordance with embodiments of the present invention to improve event recognition, including a values, deviance detection and deviance correction. Established correlational systems cannot distinguish underlining deviant values from apparent deviant values that are not in fact deviant. The present method can uniquely discount such apparently deviant values by using previously generated forecasts and to identify those apparently deviant values that are close to their forecast values, and therefore most likely are not deviant. The output processor function 282 received deviance values from the screener kernel function 274 in the correlator kernel 276 along with all ports from the forecaster function 284 for utilization in accordance with embodiments of the present convention as further described below.

Figure 7:
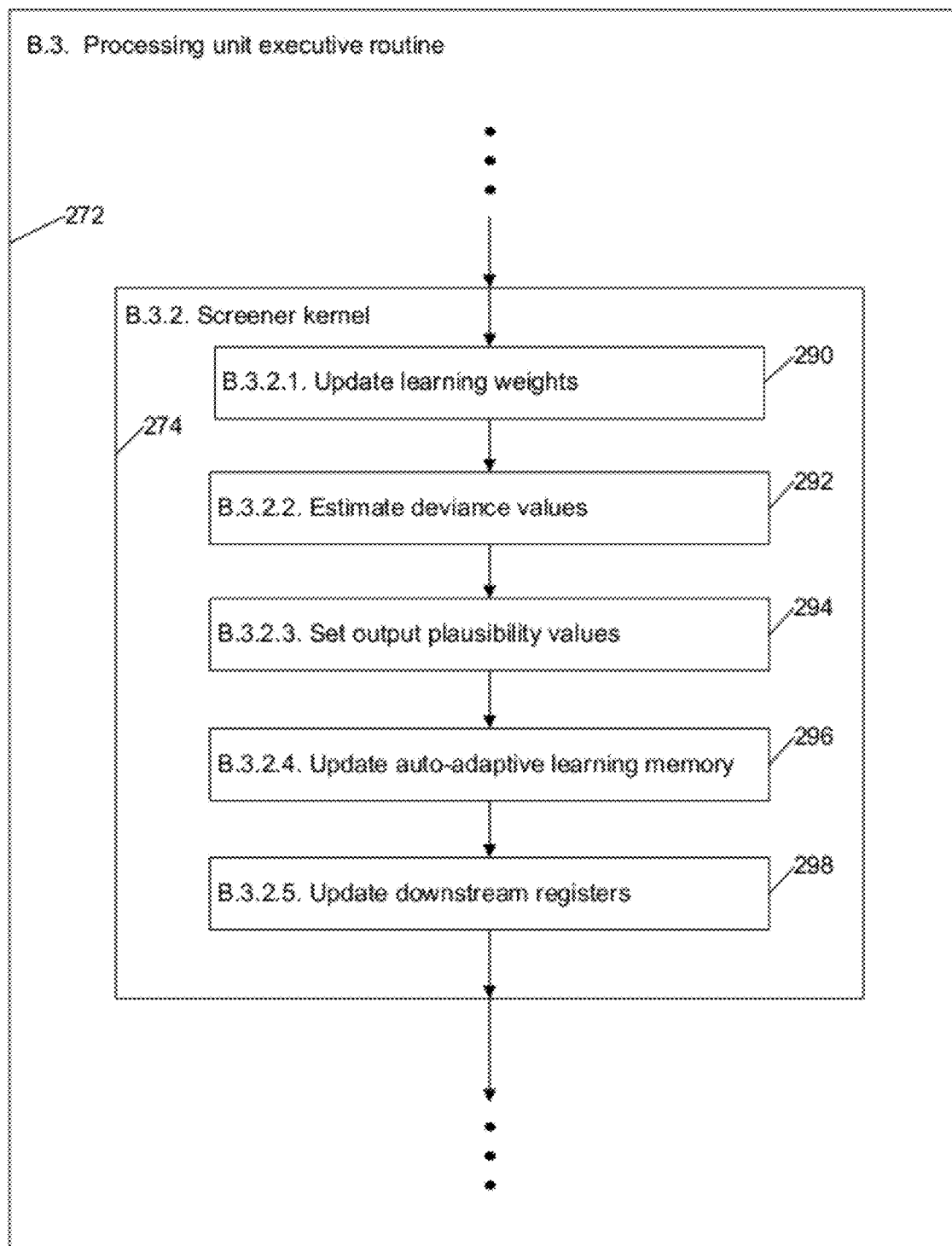
Figure 8:
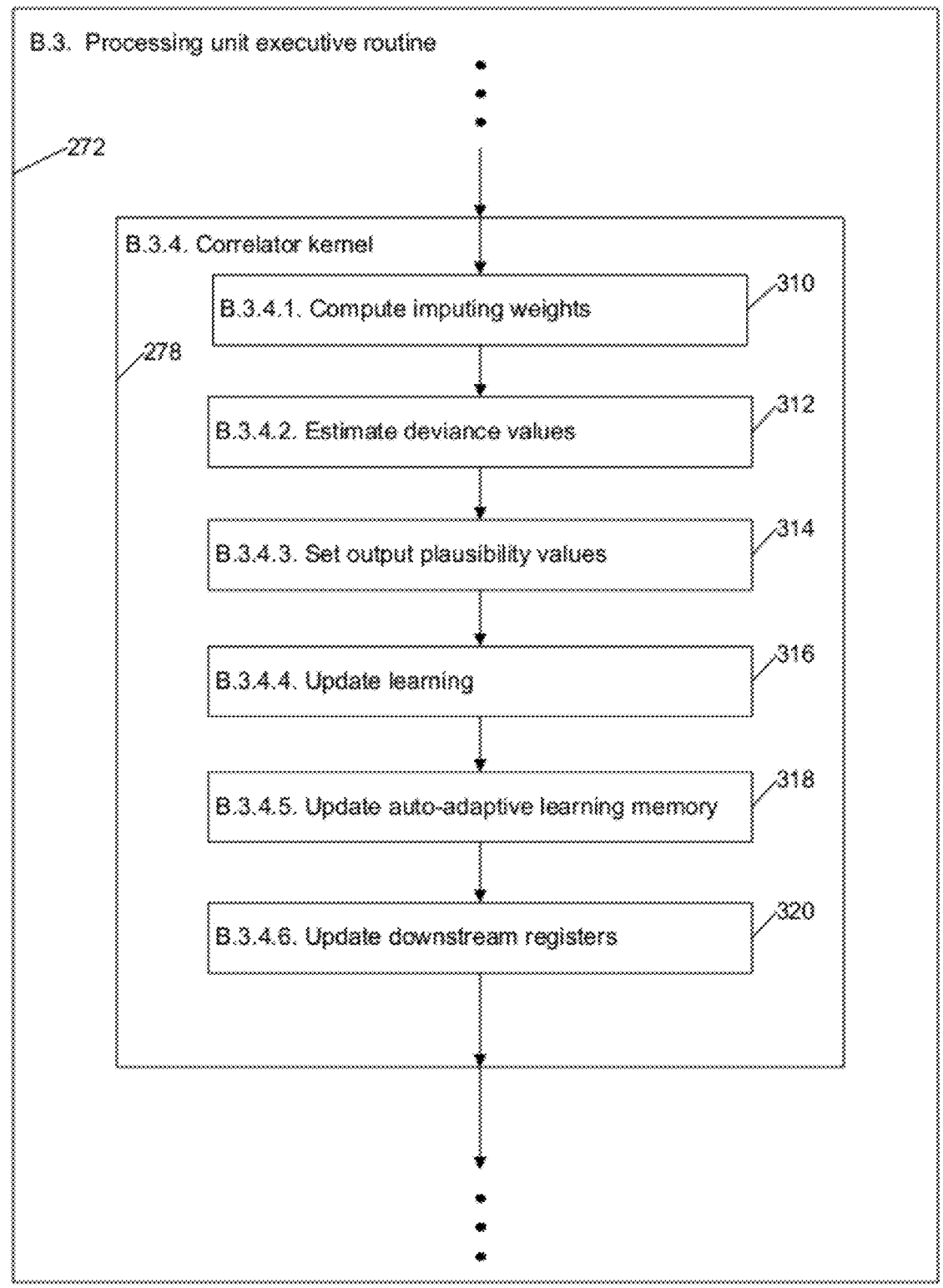

FIG. 7 is a flowchart illustrating the operation in programming of the screener kernel 274. At block 290, learning weights are updated. At block 292, deviance value estimation is performed, and an ALM updating is performed. At block 294, in accordance with embodiments of the present convention, the screener kernel function 274 provides output plausibility values for use in identifying deviant events. At block 298, downstream registers are updated. The functions at blocks 290 through 298 are separable and may be performed in parallel.

FIG. 8 is a flowchart illustrating the operation and programming of the correlator kernel 278. At block 310, imputing weights are calculated based on most recently updated correlator learned parameters. At block 312, deviance values are estimated by use of the correlator kernel 278. At block 314, output plausibility values are set utilizing the correlator kernel 278. At block 318, the ALM values are updated, and at block 320, downstream registers are updated.

Figure 9:
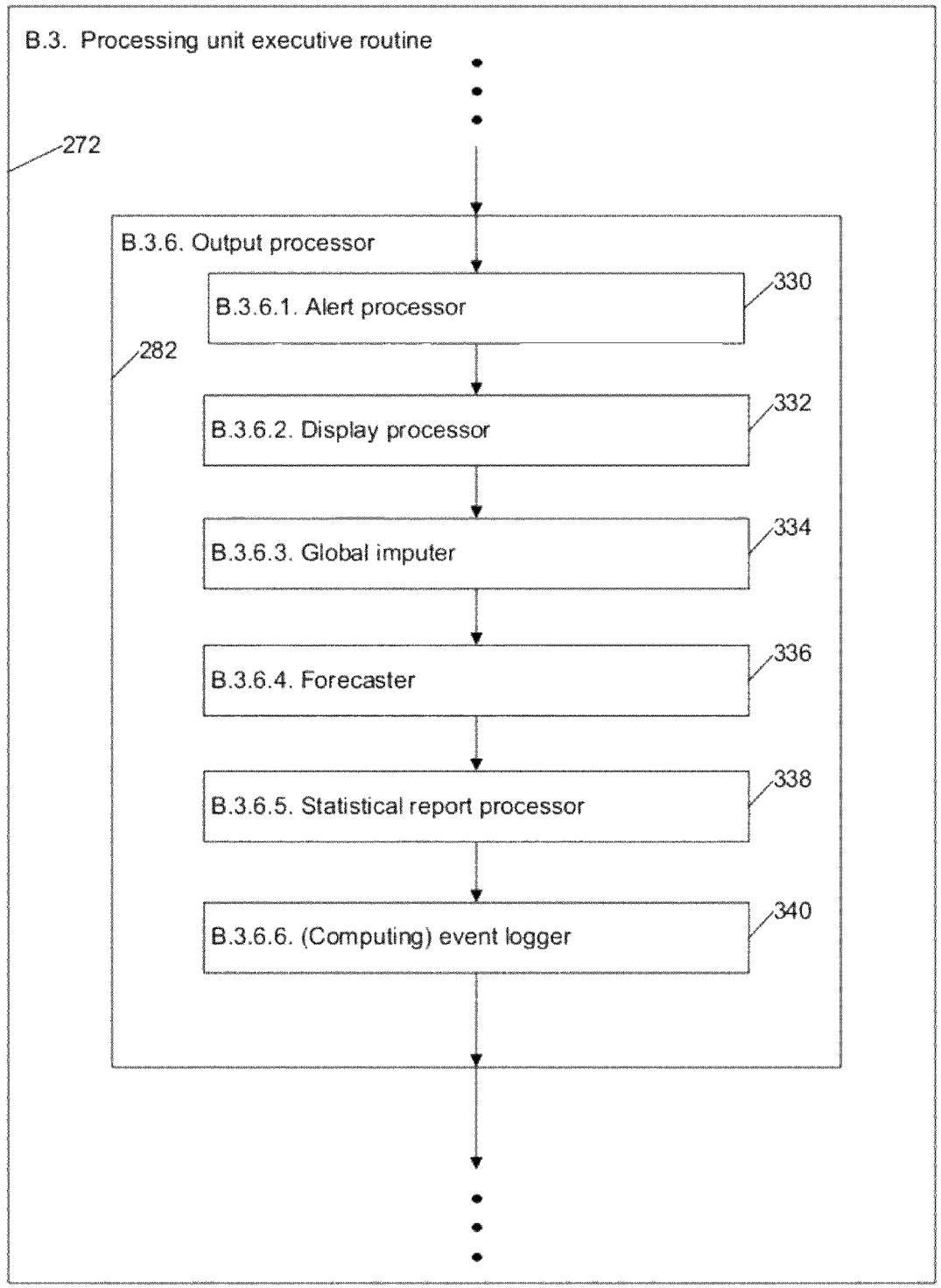

FIG. 9 is a flow chart illustrating the operation and programming of the output processor 282. At each time slice, the output processor routine 282 calls an alert processor routine 330 which provides values to the alert module 150. The alert processor module 330 utilizes deviance and plausibility values provided to it from the screener kernel module 46 and the correlator kernel 50. The alert processor routine 330 employs an easily programmable window function. The window function selects an estimation set for processing. The display processor routine 332 operates in a similar matter to produce outputs for graphical display. A global imputer routine 334 operates similarly to the alert processor routine 330 to produce imputed metrics. The imputer routine 334 utilizes plausibility values based on previously obtained input metrics from the data gathering routine 210 (FIG. 4). A forecaster routine 336 produces excessive outputs. A statistical report processor 45 and the event longer routine 340 produced current results and overwrite prior results.

Figure 10:
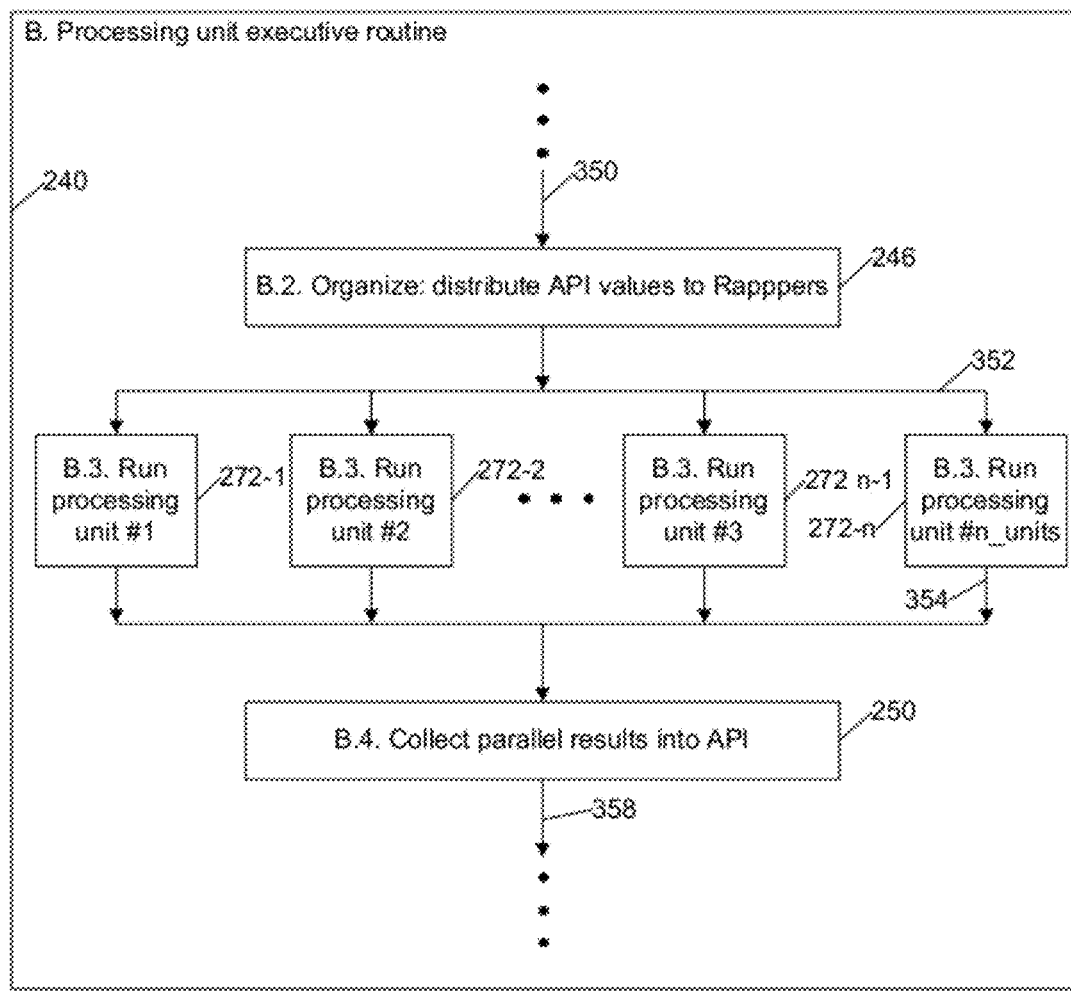
FIG. 10 is a flowchart illustrating parallel processing of generated values according to an embodiment of the present invention.
Figure 11:
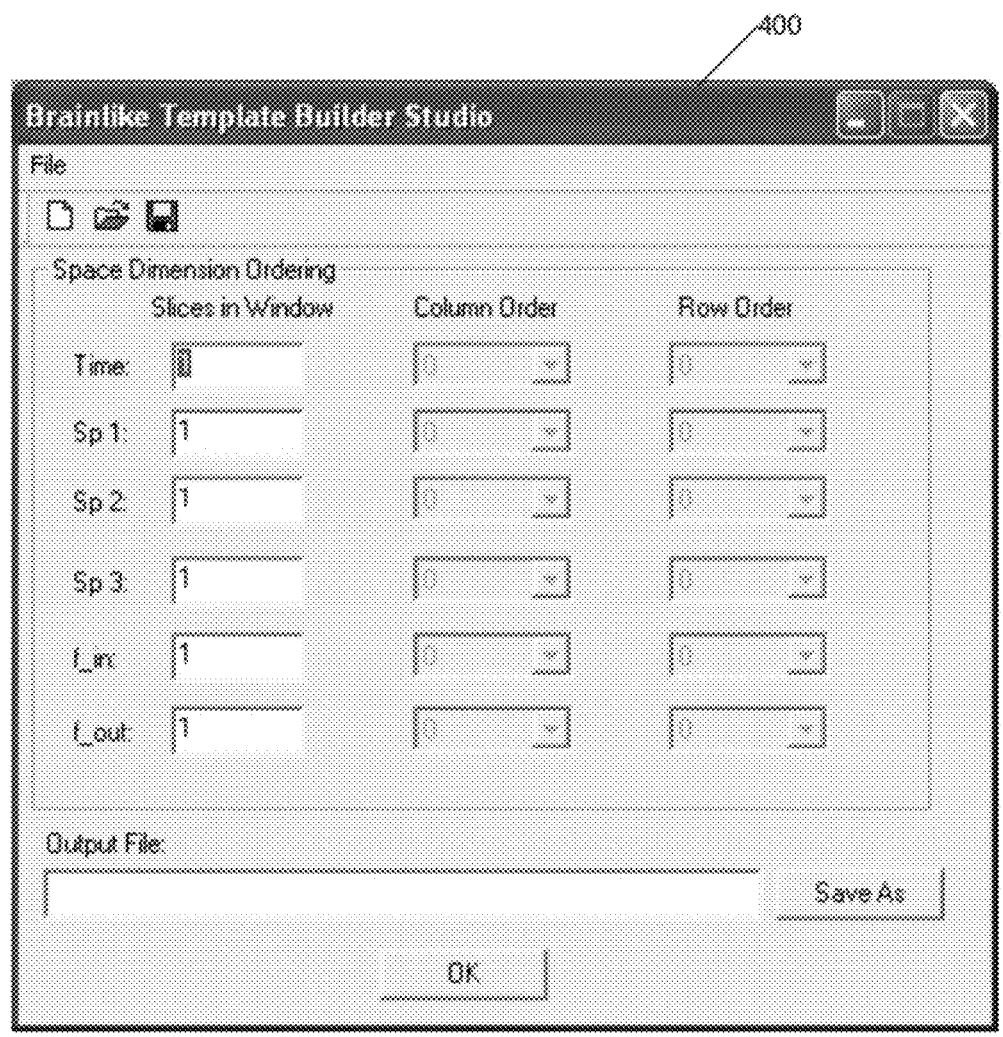
FIGS. 11-15 are user interface diagrams illustrating a set of example user interface screens for creating weighted templates for use in constructing features that may distinguish target data from clutter data according an embodiment of the present invention.

FIG. 10 is a flowchart illustrating parallel operation of the processor module of FIG. 5. During each time slice, the processing unit executive routine 240 provides the parallel processing module 246 (FIG. 5) with API values 350. At block 352, the parallel organizer 246 provides API input values including configuration parameters and input measured values along with auto-adaptive learning memory values. In block 352, values are distributed to separate processing modules. For example, the first 64 input values and their corresponding plausibility values would be supplied to module 272-1. Successive groups of 64 output values and corresponding plausibility values would be supplied to modules 272-2 through 272-n. In this manner, output values for an entire line are collected and at step 354 are combined and provided as collected parallel outputs and for the API at block 250. The parallel collected output processor output values 250 are received at an output 358 (FIG. 5). Consequently, operation of the multiple processing units is enabled.

FIGS. 11-15 are user interface diagrams illustrating a set of example user interface screens 400-440 for creating weighted templates for use in constructing features that may distinguish target data from clutter data according an embodiment of the present invention. In one embodiment, a template builder module implements all of the template builder functionality and is a hardware or software (or a combination of both) implemented module that runs on the auto-adaptive network.

In the illustrated embodiment, screen 400 provides an auto-adaptive template builder that allows an analyst to create weight templates for computing auto-adaptive application features. Advantageously, screen 400 simplifies the complicated task of creating a weight template for a weighted function that includes several output features that are computed as several input features and organized along several time and space slices in multiple space dimensions.

The template builder screen 400 allows analysts to create weighting function templates with input and output features, along with time and space slices, organized and labeled along rows and columns in accordance with the desired application. Once the analyst has specified the desired weight structure, a template weight file is written to memory, for example in a comma separated value ("csv") form. The template file preferably contains row and column labels, along with default weight values. In one embodiment, the default weight values may be set to the value of 1. The analyst (or other analysts) may later change the default weight values as desired, save the modified weight template to memory (volatile or persistent), and run the template builder with the modified weight template file as input.

In one embodiment, the template builder screen 400 may include input tabs and drop down input fields that allow the user to control how the templates are ordered.

Figure 12:
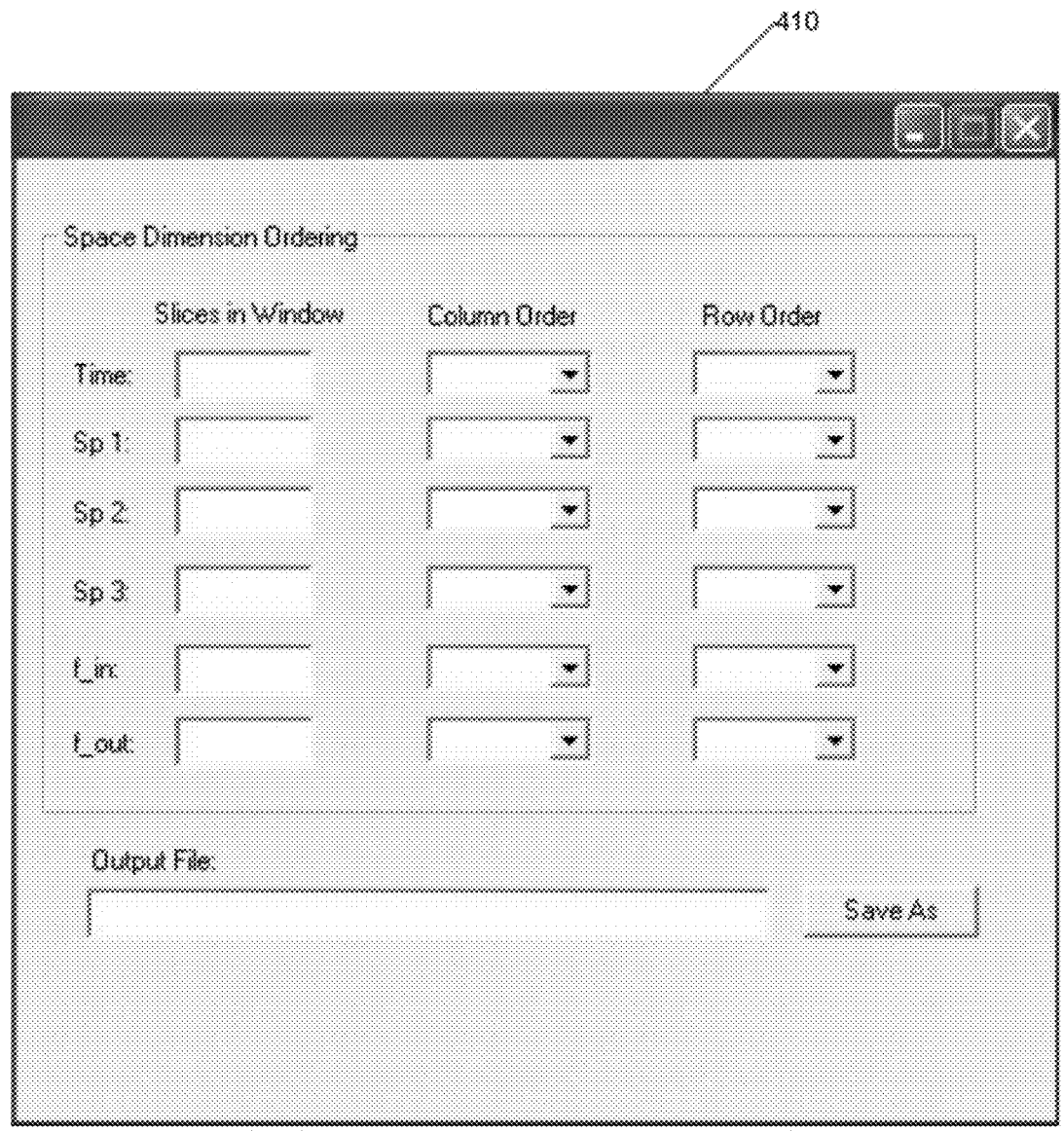
Figure 13:
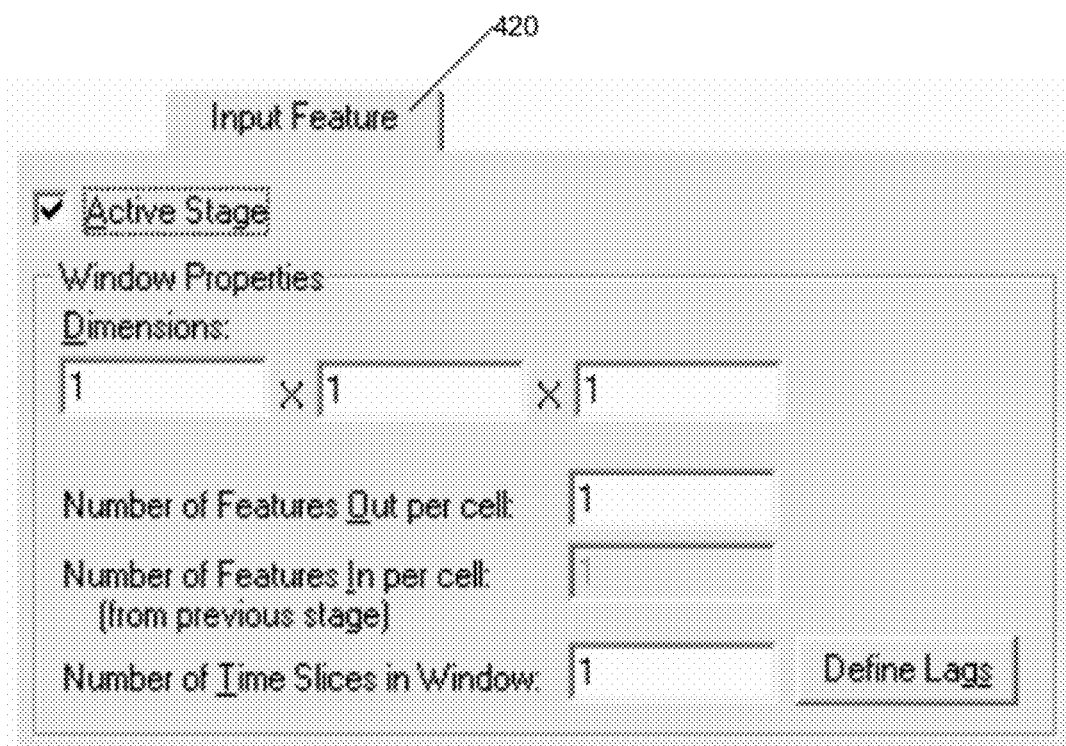

FIG. 12 illustrates an example template builder console screen 410 and FIG. 13 shows an example template input feature tab 420. In FIG. 13, the three input fields below the word "Dimensions:" refer to Sp1, Sp2, and Sp3 on FIG. 12. Additionally, the "Number of Features Out per cell" and "Number of Features In per cell" on FIG. 13 correspond to "f_out" and "f_in" on FIG. 12, respectively. Also, the "Number of Time Slices in Window" in FIG. 12 corresponds to the "Time" field in FIG. 12. Finally, the "Column Order" and "Row Order" fields shown on the template builder console screen 410 in FIG. 12 allow an analyst to specify the way the output is to be aligned.

Figure 14:
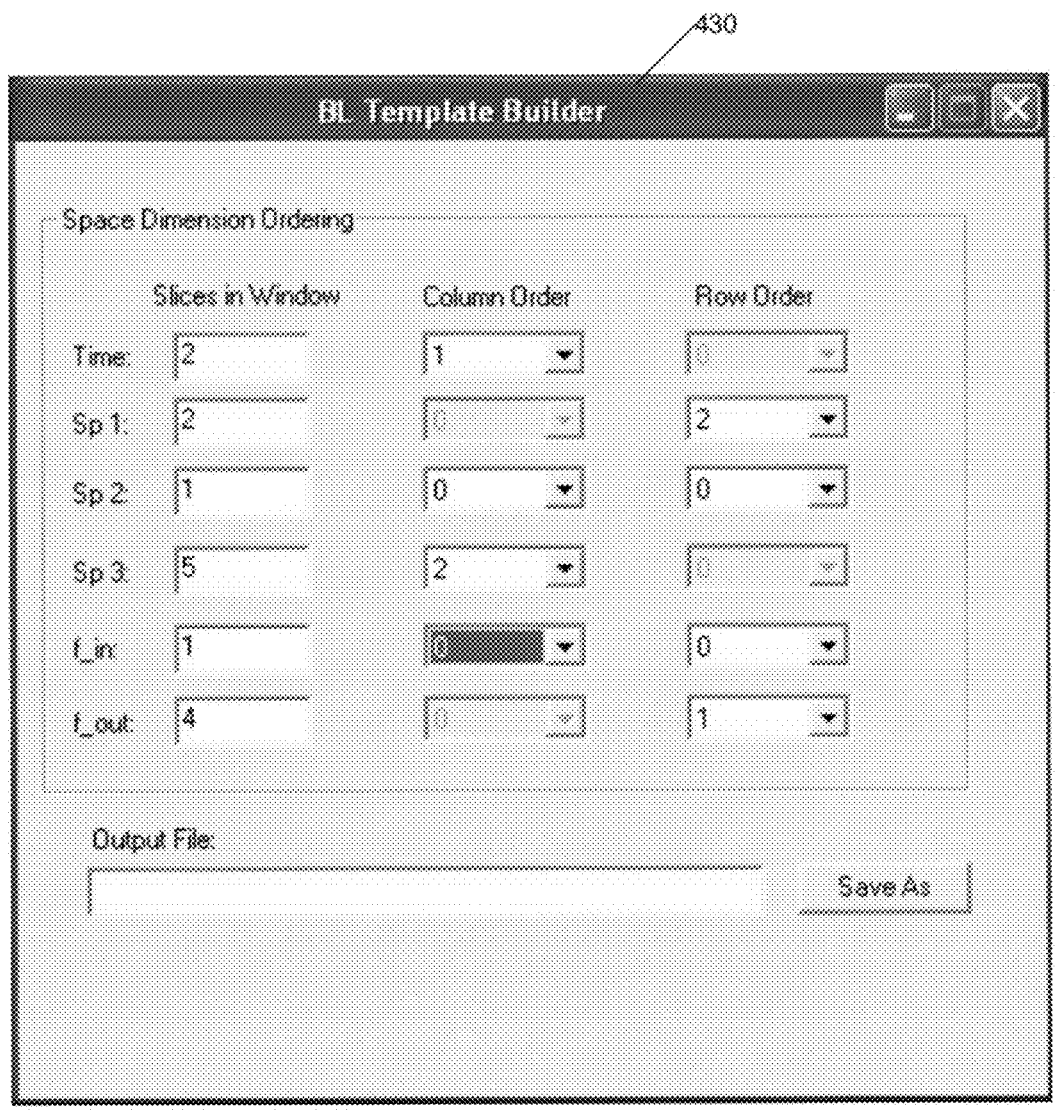

For example, FIG. 14 shows how a template looks after the desired metrics have been entered. In the illustrated example, Time and Sp1 each have two slices, Sp1 has one slice, Sp3 has five slices, f_in has one slice, and f_out has four slices. After entering the slices data via the template builder console screen 410 the analyst then selects the order that the columns should be displayed and determines whether the dimension data is to be shown in a column or not.

Figures 15, 16:
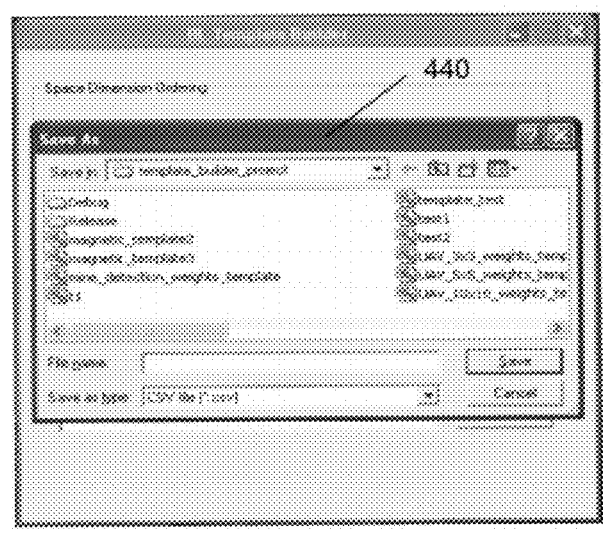
FIG. 16 is a data diagram illustrating an example data set in .csv format according to the example embodiment described with respect to FIGS. 11-15.

In the example shown in screen 430 of FIG. 14, Time is the first column and Sp 3 is the second column. The row ordering follows the same style as the column ordering. f_out is the first row and Sp1 is the second row. Also, Sp 2 and f_in are not used in the column or row order. Advantageously, the analyst may determine whether or not to use all of the dimensions for output. After the analyst has established the slices and row/column ordering, the template file can be saved in volatile or persistent memory for later use. FIG. 15 illustrates an example save as screen 440 that can be used to save the template file in csv format. FIG. 16 is a data diagram illustrating an example data set 450 in csv format according to the example embodiment described above.

Figure 17:
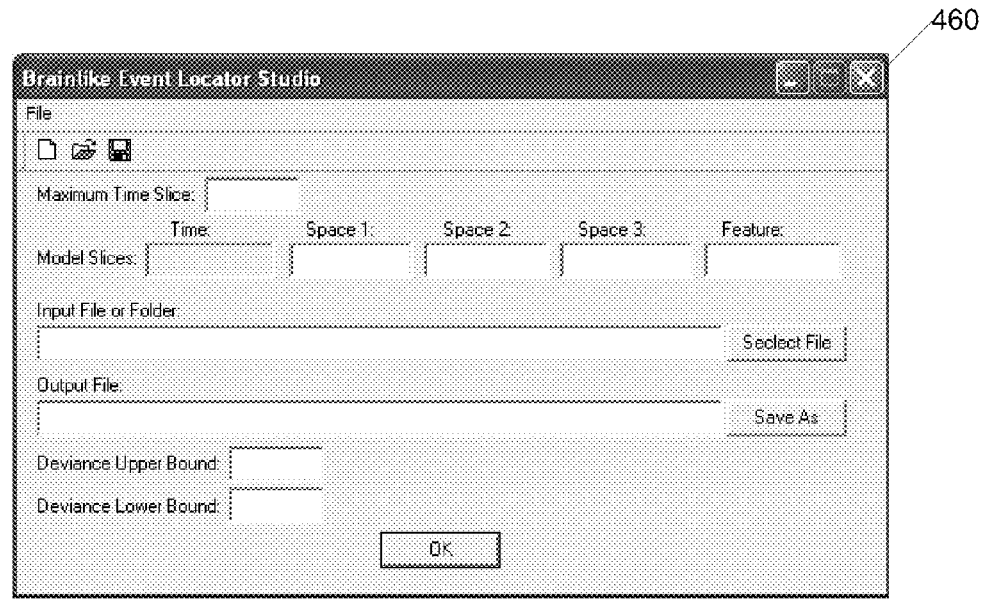
FIGS. 17-18 are user interface diagrams illustrating a set of example user interface screens for locating events in a data set according an embodiment of the present invention.
Figure 18:
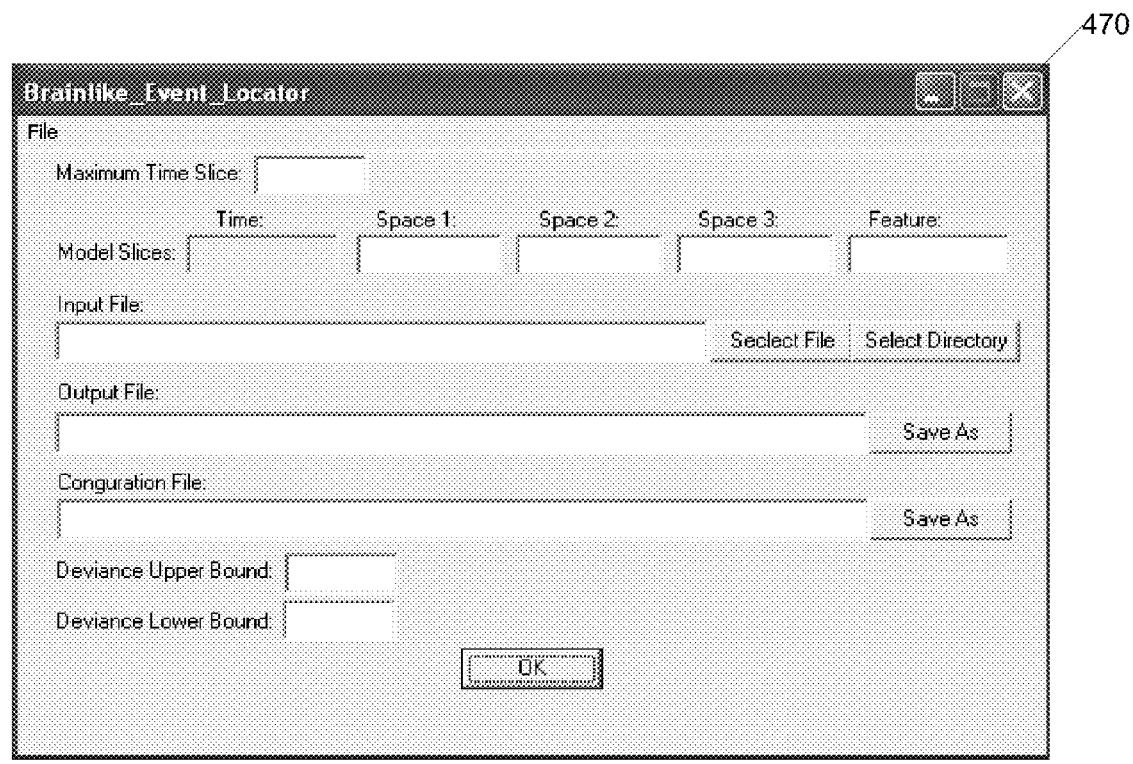

FIGS. 17-18 are user interface diagrams illustrating a set of example user interface screens 460-470 for locating events in a data set according an embodiment of the present invention. In one embodiment, an event locator module implements all of the event location functionality and is a hardware or software (or a combination of both) implemented module that runs on the auto-adaptive network.

In FIG. 17, the event locator console screen 460 converts deviance values from a data set to an event location file that can be later used by the event extractor. Advantageously, this allows an analyst to view windows containing false alarm feature values so the analyst can determine which feature/clutter data combinations are causing false alarms. These features can then be modified as necessary to provide improved results and less false alarms.

The event locator console screen 460 also allows an analyst to create custom event location files for use with the event extractor. The event locator console screen 460 also allows the analyst to input either a single .h5 file or an entire directory of .h5 files. In one embodiment, each .h5 file in the directory is of the same dimension as every other .h5 file in the directory. The single file or plurality of files can be searched for events that will be displayed in the output event location file. Events comprise data from the data set that does not fall between the deviance upper bound and the deviance lower bound. The deviance upper and lower bounds are data entry fields on the event locator console screen 460 that allow an analyst to configure these bounds as options. In one embodiment, the events location file is a file stored in volatile or persistent memory that contains each of the events mentioned above with a detailed description of where they occurred in the file.

FIG. 18 illustrates an example event locator screen 470 that allows an analyst to specify a predetermined configuration file that can be used by the system to set particular parameters or provide certain data for use during operation. The various input fields shown in FIG. 18 are described below:

Max Time Slice—Sets the maximum number of time slices that can be processed by the input file or files inside a folder. The product of your Model Slices must not exceed this number.

Models Slices—Time is grayed because this configuration will be derived from the input file. In .h5 format in correlation to the Auto-Adaptive Event Locator Time Model Slices correspond to the number of rows that the input file contains. Space 1, 2, 3 and feature Model Slices allows the analyst to select how the space dimensions for the file is modeled.

Select File Button—Allows the analyst to select a single file for input.

Select Directory Button—Allows the analyst to select a folder containing multiple .h5 files for input (each with the same dimensions).

Save As Button—Allows the analyst to create an output file and choose where it will be located or select a previous file and overwrite it.

Save As Button (2nd)—Allows the analyst to select the name of the configuration file.

Deviance Upper Bound—The highest number a value inside the input file can exceed before it is considered an event.

Deviance Lower Bound—The lowest number a value inside the input file can fall below before it is considered an event.

OK Button—Starts Program Execution.

File—contains the following menu options: (a) Open—Allows the analyst to select and open a previously saved configuration file; (b) Exit—Closes the application.

Figure 19:
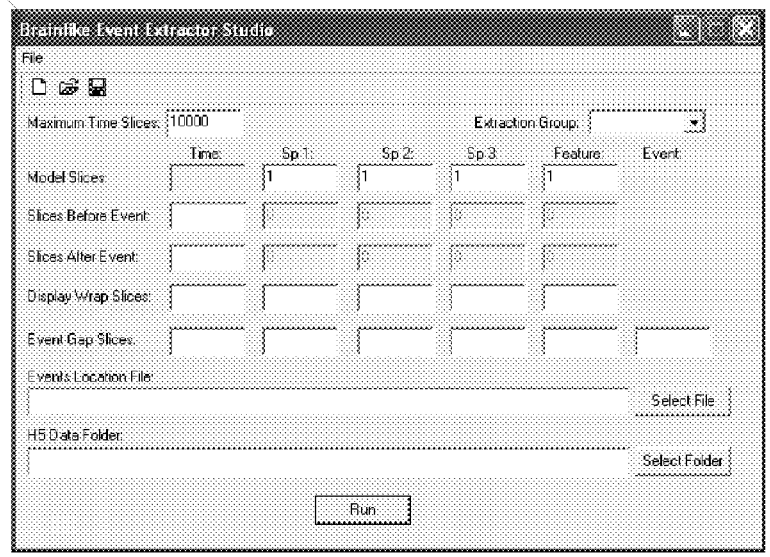
FIGS. 19-20 are user interface diagrams illustrating a set of example user interface screens for extracting events from a data set according an embodiment of the present invention.
Figure 20:
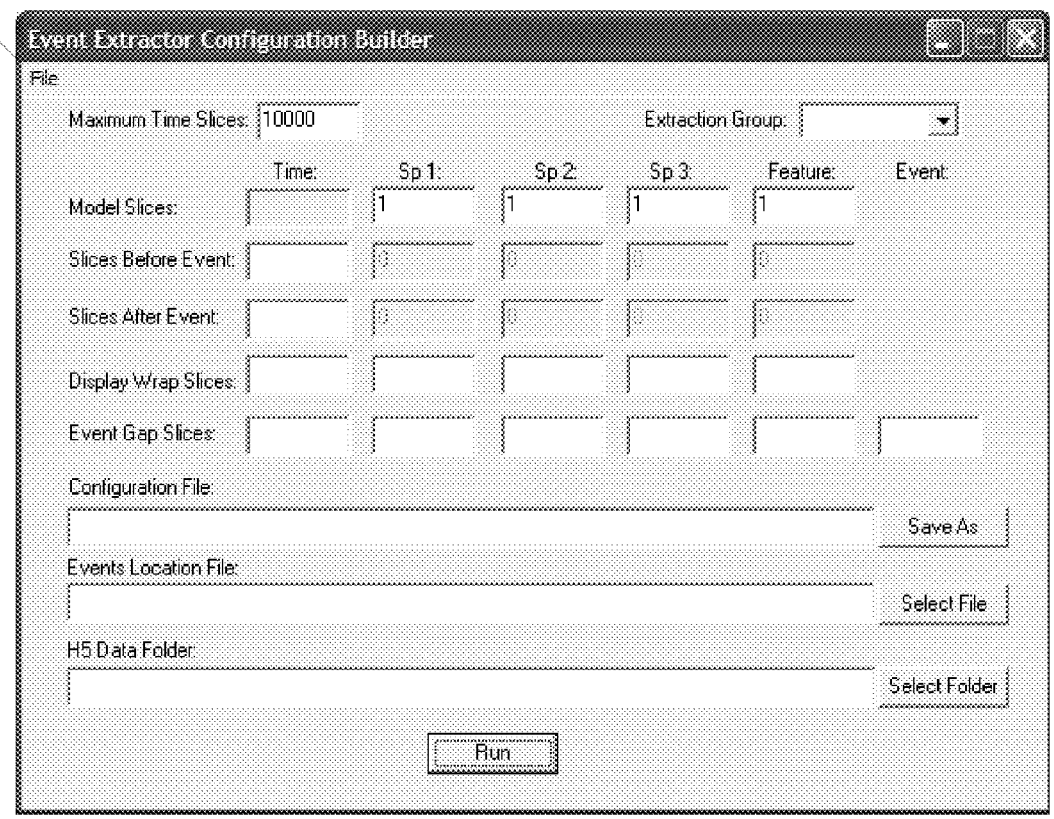

FIGS. 19-20 are user interface diagrams illustrating a set of example user interface screens for extracting events from a data set according an embodiment of the present invention. In one embodiment, an event extractor module implements all of the event extraction functionality and is a hardware or software (or a combination of both) implemented module that runs on the auto-adaptive network.

In the illustrated embodiment of FIG. 19, the event extractor console screen 480 allows an event location file to be specified. The event location file contains feature values for events of interest and allows those events to be selected and displayed to an analyst in windows or selected and programmatically analyzed. In one embodiment, when an analyst works with target data that is organized in space by time grids, the analyst typically begins by viewing windows containing the target data. The event extractor console screen 480 allows the analyst to quickly view the target data from one or many event location files containing target images. Based on these images, the analyst can then construct features that preferably distinguish target data from clutter data. These features can be constructed using the previously described template builder module. The analyst or another analyst can then exercise the templates in the auto-adaptive network to evaluate hit versus false alarm performance.

In one embodiment, after running the auto-adaptive network to evaluate such performance, the analyst may then use the event locator module in conjunction with event extractor module to view false alarm windows and modify features as necessary to improve performance. Advantageously, iterative repetitions of the process can be performed to optimize the auto-adaptive network. The event extractor module also allows the analyst to extract a set of data from multiple .h5 input files for analysis. In one embodiment, the location of the events to be extracted is contained in an event location file that was created by the event locator module.

In one embodiment, the analyst can determine the window size of the extracted data, how the data will be wrapped, and how output events will be separated by rows and/or columns of zeros. Additionally, the event extractor module can be activated via the auto-adaptive network suite of applications or by running the event extractor executable via a command line interface with the full name of the configuration file as the argument. For example:

<prompt>Brainlike_Event_Extractor_Main.exe
"C:\Brainlike_Event_Extractor_Main\MINE_DATA"

FIG. 20 illustrates an example event extractor screen 490 that allows an analyst to specify a predetermined configuration file that can be used by the system to set particular parameters or provide certain data for use during operation. The various input fields shown in FIG. 20 are described below:

Maximum Time Slices—this value is used for feature memory allocation. The largest .h5 input file time slices should not be larger than this value.

Extraction Group—use the pull down menu to select the Group Name where the input event data will be extracted from in the .h5 input file.

Model Slices—the Model Slices describe the .h5 input feature size.

Slices Before Event—determines the number of slices before or above where the event occurs, where extraction would begin. This value defaults to 0 and is disabled unless the value for the Model Slices for the corresponding feature is greater than 1. The sum of the Slices Before Event and Slices After Event must be less than the corresponding Model Slices value.

Slices After Event—determines the number of slices after or below where the event occurs, where extraction would end. This value defaults to 0 and is disabled unless the value for the Model Slices for the corresponding feature is greater than 1. The sum of the Slices Before Event and Slices After Event must be less than the corresponding Model Slices value.

Display Wrap Slices—"1" for ON and "0" for OFF. This should only be on when the corresponding Slices Before Event or Slices After Event is greater than 0. When set to ON, the data on the opposite end is used to wrap the Before/After Event slices. When set to OFF, the Before/After Event slice values are zeros.

Event Gap Slices—number of gap slices after each slice of each dimension. If the feature is a row, then a row of zero will be inserted at the end of that feature slice (which could span more than 1 row) in the output. The same logic applies to the column feature.

Configuration File—receives the full path and file name of the configuration file into the input field. The analyst may also click the Save As button to select an existing configuration file to over write it.

Events Location File—select an events location file to use.

Run—this button saves all parameter values into the configuration file indicated in the Configuration File input field, then activates the event extractor module with the saved configuration file as the input argument.

File—contains the following menu options: (a) Open—allows the analyst to select and open a previously saved configuration file and thereby populate the parameters using an existing configuration file; (b) Exit—closes the application.

Turning now to the auto-adaptive risk analyzer module, in one embodiment the risk analyzer module implements all of the risk analysis functionality and is a hardware or software (or a combination of both) implemented module that runs on the auto-adaptive network.

The auto-adaptive risk analyzer module analyzes information about hit rates, false alarm rates, alarm costs, and risk factors to determine certain return on investment calculations and hit versus false alarm curves (i.e., receiver operating characteristic or ROC curves), as set forth in Table 1 below. Advantageously, the risk analyzer module may use hits and false alarm rates that are supplied by an analyst or obtained from memory where it was stored by the auto-adaptive event locator module and/or the auto-adaptive event extractor module.

TABLE 1

BUSINESS CASE
MODEL PARAMETERS

| PARAMETER NAME | VALUE | CELL(S)* | COMMENTS |
| --- | --- | --- | --- |
| Preliminary Prospect Qualification Cost | $200,000 | B!B12 | This value reflects time and effort associated with establishing whether or not the prospective application is sufficiently promising to justify further adaptive system development. The entry reflects Brainlike as well as prospective customer time and effort. |
| Added Value Determination and Preliminary Design Cost | $750,000 | B!B13 | These tasks could be completed in six months or less, provided that data and domain expertise were readily available from a committed basic operational monitoring organization. |

TABLE 1-continued

BUSINESS CASE MODEL PARAMETERS

| PARAMETER NAME | VALUE | CELL(S)* | COMMENTS |
| --- | --- | --- | --- |
| Operational Design, Integration, and Testing Cost | $2,000,000 | B!B14 | These tasks could be completed in 12 months or less, provided that data and domain expertise were readily available. |
| Annual Licensing and Maintenance Savings | $1,000,000 | B!B21 | Licensing is on a per system basis. This entry is based on subtracting Stationary Monitoring System maintenance costs that would no longer be necessary from Brainlike annual licensing and maintenance costs. Costs that would no longer be necessary would include operational staffing costs as well as analytical re-tuning costs. |
| Preliminary Prospect Disqualification Risk Probability | 0.50 | C!29 | Like the other risk probability values listed, this value must be nonnegative and the sum of all such values must not exceed 1. |
| Insufficient Determined Added Value Risk Probability | 0.15 | C!30 | Like the other risk probability values listed, this value must be nonnegative and the sum of all such values must not exceed 1. |
| Operational Deployment Failure Risk Probability | 0.10 | C!31 | Like the other risk probability values listed, this value must be nonnegative and the sum of all such values must not exceed 1. |
| Annual Number of Monitoring Time Points | 350,400 | A!C12, N!C12, S!C12 | The default value is based on an annualized monitoring rate of 4 checks per hour. |
| Annual Expected Number of Alerts | 100 | A!C13, S!C13 | This is the value that is used in both the No Monitoring case and the Adaptive Monitoring case. In typical advisory applications this value is tied to the maximum rate that an Alert responder could tolerate. The default value is based on an annualized rate of 3 warnings per 8-our shift. This value must not exceed the Annual Number of Alarm Points. |
| Annual Expected Number of Identifiable Target Events | 2 | A!C14, N!C14, S!C14 | The default value is based on an annualized rate of 10 target events per month. This number must not exceed the Annual Number of Alarm Points. |
| Annual Expected Number of Alerted Target Events with Stationary Monitoring | 1 | A!C15, S!C15 | In most applications, this entry is the most influential variable on overall expected annual costs. The default value shown is the half of the best possible value, given the other default values. This number must not exceed either the Annual Expected Number of Alerts or the Annual Expected Number of Target Events. |
| Annual Expected Number of Alerted Target Events with Adaptive Monitoring | 2 | A!C15 | In most applications, this entry is the most influential variable on overall expected annual costs. The default value shown is the best possible value, given the other default values. This number must not exceed either the G25 value or the F24 value. |
| Cost of Responding to One False Alert | $250,000 | A!C16, N!C16, S!C16 | The default value is tied to the cost of contacting a person to investigate an alert that turns out to be false. |
| Cost of Responding to One Valid Alert | $5,000,000 | A!C17, N!C17, S!C17 | The default value is tied to the cost of contacting a person to investigate analert that turns out to be true and taking appropriate action. |
| Cost of Not Anticipating One Target Event | $50,000,000 | A!C18, N!C18 S!C18 | The default value is tied to relatively high missed opportunity costs. |

TABLE 1-continued

BUSINESS CASE MODEL PARAMETERS

| PARAMETER NAME | VALUE | CELL(S)* | COMMENTS |
|---|---|---|---|
| Expected Five Year Return on Investment, Risk-Adjusted | $53,587,500 | B!D33 | |
| Expected Annual Savings, Non-Risk-Adjusted | $43,300,000 | B!B23 | |

Figure 21:
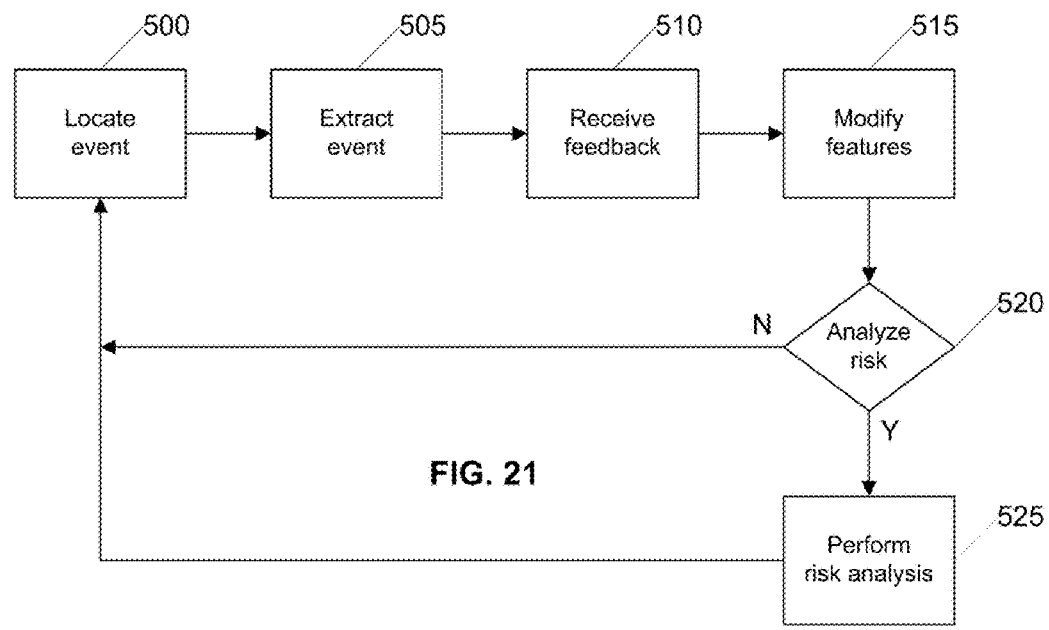
FIG. 21 is a flow diagram illustrating an example process for implementing an auto-adaptive network according to an embodiment of the present invention.

*Cells with labels of the form A!cr, B!cr, N!cr, and S!cr indicate corresponding row and cell numbers on spreadsheets entitled ADAPTIVE_MONITORING, BUSINESS_CASE, NO_MONITORING, and STATIONARY_MONITORING, respectively FIG. 21 is a flow diagram illustrating an example process for implementing an auto-adaptive network according to an embodiment of the present invention. The process may be implemented by any of a variety of components in an auto-adaptive network including both hardware and software implemented modules running in an auto-adaptive network. Initially, in step 500 the system locates an event in a data set. This step can be carried out, for example, by the event locator module. Once the event is located, in step 505 the event is extracted from the data set so it can be discretely processed by the auto-adaptive network. This step can be carried out, for example, by the event extractor module. Next, after the event has been analyzed by an analyst or a programmed module, in step 510 the auto-adaptive network system receives feedback. In one embodiment, the feedback may provide information to distinguish between non-useful clutter data and useful target data. Advantageously, in step 515 the feedback can be used to modify certain features of the system so that future data analysis can more accurately distinguish between clutter data and target data. In this fashion, the auto-adaptive network iteratively optimizes its performance over time.

In one embodiment, the auto-adaptive network system may also analyze risk and risk factors once a sufficient corpus of data is available. If the system determines in step 520 to perform a risk analysis, then in step 530 the risk analysis is undertaken and information about hit rates, false alarm rates, alarm costs, and risk factors are examined to determine certain return on investment calculations and ROC curves as previously described.

Figure 22:
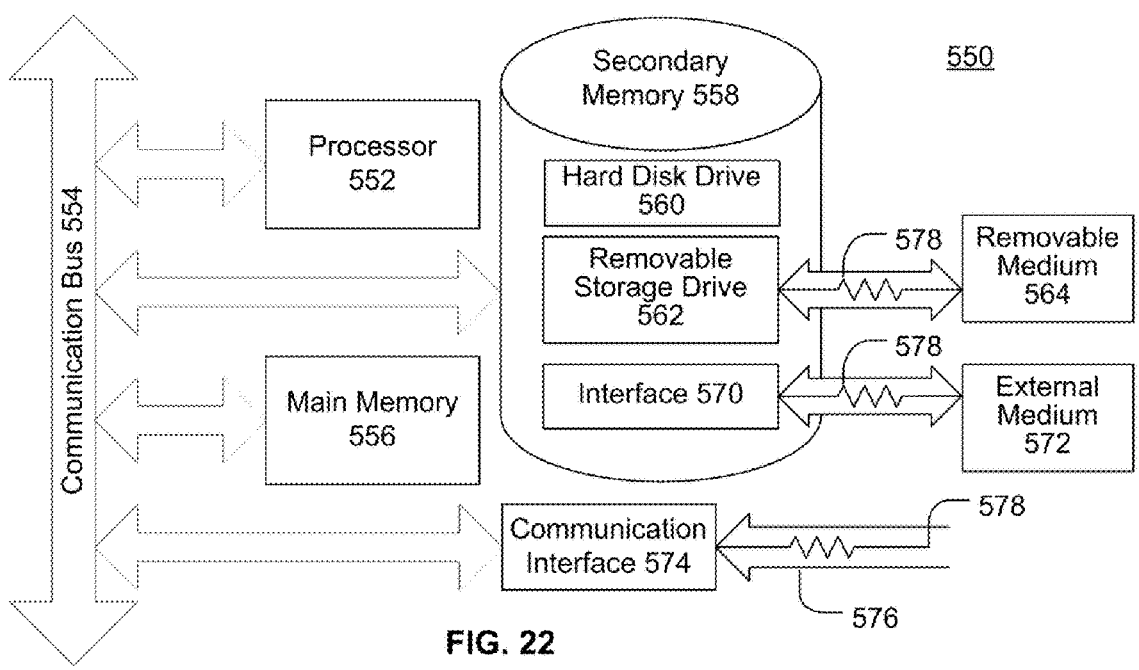
FIG. 22 is a block diagram illustrating an example computer system that may be used in connection with various embodiments described herein.

FIG. 22 is a block diagram illustrating an example computer system 550 that may be used in connection with various embodiments described herein. For example, the computer system 550 may be used in conjunction with certain components of the systems shown in FIGS. 1-3. However, other computer systems may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or FPGAs. Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

The invention claimed is:

1. A computer implemented method for processing a data set collected through a sensor array over successive time slices comprising:
   locating an event in the data set, the event having a plurality of data points;
   extracting the event from the data set;
   defining a number of dimensions for each data point in the event, wherein at least one dimension has a dependent data location for which a value will be imputed;
   imputing a value to a plurality of dependent data points in accordance with an estimation function by sequentially calculating a value for each successive data point; and
   analyzing the data set including the imputed value of the dependent data point to categorize the event as a hit or a false alarm.

2. The method of claim 1, further comprising analyzing a plurality of events to determine a hit versus false alarm curve.

3. The method of claim 1, further comprising analyzing a plurality of events to determine a return on investment value.

4. The method of claim 1, further comprising utilizing the calculated dependent values to update an auto-adaptive function.

5. The method of claim 1, wherein analyzing the data set comprises receiving an identification of feature functions that distinguish target data from clutter data.

6. A computer readable medium having stored thereon one or more sequences of instructions for causing one or more microprocessors to perform the steps for processing a data set collected through a sensor array over successive time slices, the steps comprising:
   locating an event in the data set, the event having a plurality of data points;
   extracting the event from the data set;
   defining a number of dimensions for each data point in the event, wherein at least one dimension has a dependent data location for which a value will be imputed;
   imputing a value to a plurality of dependent data points in accordance with an estimation function by sequentially calculating a value for each successive data point; and
   analyzing the data set including the imputed value of the dependent data point to categorize the event as a hit or a false alarm.

7. The computer readable medium of claim 6, wherein the steps further comprise analyzing a plurality of events to determine a hit versus false alarm curve.

8. The computer readable medium of claim 6, wherein the steps further comprise analyzing a plurality of events to determine a return on investment value.

9. The computer readable medium of claim 6, wherein the imputing step comprises imputing a value to a plurality of dependent data points in accordance with an estimation function.

10. The computer readable medium of claim 6, wherein the steps further comprise utilizing the calculated dependent values to update an auto-adaptive function.

11. The computer readable medium of claim 6, wherein the analyzing the data set step comprises distinguishing target data from clutter data.

12. A system for processing a data set collected through a sensor array over successive time slices comprising:
   a data storage area storing the data set;
   a processing unit communicatively coupled with said data storage area and configured to execute a plurality of auto-adaptive modules;
   an event locator module configured to be executed by said processing unit to locate an event in the data set, the event having a plurality of data points;
   an event extractor module configured to be executed by said processing unit to extract the event from the data set;
   an arithmetic unit configured to be executed by said processing unit, said arithmetic unit configured to define a number of dimensions for each data point in the event, wherein at least one dimension has a dependent data location for which a value will be imputed by the arithmetic unit; and
   an output module configured to be executed by said processing unit, said output module configured to analyze the data set including the imputed value of the dependent data point to categorize the event as a hit or a false alarm.

13. The system of claim 12, further comprising an auto-adaptive function calculator and means for utilizing a data matrix to update an auto-adaptive function.

14. The system of claim 13, further comprising a window generator configured to step through at least a portion of the data matrix beginning with a first frame location and ending with a last frame location.

15. The system of claim 12, wherein the output module is further configured to utilize a calculated dependent data value to update an auto-adaptive function.

16. The system of claim 12, further comprising an event detection processor coupled to access values produced by said processing unit.

17. The system of claim 12, further comprising an adaptive control circuit to select one of a plurality of actions based on calculation of data to an auto-adaptive function.

18. The system of claim 12, further comprising a transmitter to provide output data indicative of said data matrix and a switching circuit to selectively transmit or not transmit data in accordance with an output of said adaptive control circuit.

* * * * *